United States Patent
Ulm et al.

(10) Patent No.: US 8,005,729 B1
(45) Date of Patent: Aug. 23, 2011

(54) ENVIRONMENT MODIFICATION USING SYSTEM AND USAGE DATA

(75) Inventors: Joshua Ulm, San Rafael, CA (US); Jeremy Clark, San Francisco, CA (US); Ye-Jeong Kim, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1544 days.

(21) Appl. No.: 11/394,447

(22) Filed: Mar. 30, 2006

(51) Int. Cl.
*G07B 17/00* (2006.01)
*G06F 3/048* (2006.01)
*H04B 1/38* (2006.01)

(52) U.S. Cl. .......................... 705/30; 715/765; 455/557

(58) Field of Classification Search .................... 705/30; 715/765; 455/557
See application file for complete search history.

(56) References Cited

U.S. PATENT DOCUMENTS

| | | | |
|---|---|---|---|
| 6,032,051 A * | 2/2000 | Hall et al. | 455/518 |
| 6,563,459 B2 * | 5/2003 | Takenaga | 342/357.1 |
| 6,681,108 B1 * | 1/2004 | Terry et al. | 455/412.2 |
| 7,031,728 B2 * | 4/2006 | Beyer, Jr. | 455/456.3 |
| 7,092,741 B2 * | 8/2006 | Naganuma et al. | 455/566 |
| 7,167,680 B2 * | 1/2007 | Haller et al. | 455/41.3 |
| 7,167,910 B2 * | 1/2007 | Farnham et al. | 709/223 |
| 7,224,963 B2 * | 5/2007 | Anderson et al. | 455/414.3 |
| 7,403,786 B2 * | 7/2008 | Caspi et al. | 455/456.3 |
| 7,496,355 B2 * | 2/2009 | Nielsen et al. | 455/414.2 |
| 7,545,784 B2 * | 6/2009 | Mgrdechian et al. | 370/338 |
| 7,546,127 B2 * | 6/2009 | Caspi et al. | 455/456.1 |
| 7,630,724 B2 * | 12/2009 | Beyer et al. | 455/457 |
| 2002/0028704 A1 * | 3/2002 | Bloomfield et al. | 463/1 |
| 2002/0066105 A1 * | 5/2002 | Asami | 725/80 |
| 2002/0086681 A1 * | 7/2002 | Gilham et al. | 455/456 |
| 2002/0132610 A1 * | 9/2002 | Chaplin et al. | 455/414 |
| 2004/0266406 A1 * | 12/2004 | Meda | 455/414.1 |
| 2005/0043060 A1 * | 2/2005 | Brandenberg et al. | 455/558 |
| 2005/0083904 A1 * | 4/2005 | Khartabil et al. | 370/351 |
| 2005/0170827 A1 * | 8/2005 | Nagashima | 455/419 |
| 2005/0215243 A1 * | 9/2005 | Black et al. | 455/417 |
| 2005/0219120 A1 * | 10/2005 | Chang | 342/357.13 |
| 2005/0227676 A1 * | 10/2005 | De Vries | 455/414.1 |

(Continued)

FOREIGN PATENT DOCUMENTS

EP 1744523 A1 * 1/2007

OTHER PUBLICATIONS

*Samsung to Lead the Global Mobile Trend with the Latest Mobile for 2006*, <http://www.samsung.com/PressCenter/PressRelease/PressRelease.asp?seq=20060309_0000239145> (visited on Sep. 11, 2006).

*Primary Examiner* — Matthew S Gart
*Assistant Examiner* — Ashford Hayles
(74) *Attorney, Agent, or Firm* — Robert C. Kowert; Meyertons, Hood, Kivlin, Kowert & Goetzel, P.C.

(57) ABSTRACT

Environment modification using system and usage data is described, including receiving environmental data from one or more sources, the environmental data being associated with an environment, determining a change in the environmental data by comparing a current value for the environmental data to a mean value for the environmental data, the change being expressed as a delta value, and applying the delta value to the environmental data to evolve the environment.

29 Claims, 16 Drawing Sheets

U.S. PATENT DOCUMENTS

| | | | |
|---|---|---|---|
| 2005/0261032 A1* | 11/2005 | Seo et al. | 455/566 |
| 2005/0264986 A1* | 12/2005 | Kee et al. | 361/681 |
| 2006/0072715 A1* | 4/2006 | Michael et al. | 379/88.12 |
| 2006/0079202 A1* | 4/2006 | Doan et al. | 455/411 |
| 2006/0111143 A1* | 5/2006 | Pande et al. | 455/556.1 |
| 2006/0114336 A1* | 6/2006 | Liu | 348/231.3 |
| 2006/0123150 A1* | 6/2006 | Iwai et al. | 710/15 |
| 2006/0148522 A1* | 7/2006 | Chipchase et al. | 455/557 |
| 2006/0152382 A1* | 7/2006 | Hiltunen | 340/691.1 |
| 2006/0155733 A1* | 7/2006 | John et al. | 707/101 |
| 2006/0164432 A1* | 7/2006 | Okagaki | 345/619 |
| 2007/0032225 A1* | 2/2007 | Konicek et al. | 455/417 |
| 2007/0032240 A1* | 2/2007 | Finnegan et al. | 455/445 |
| 2007/0192140 A1* | 8/2007 | Gropper | 705/3 |
| 2008/0021645 A1* | 1/2008 | Lau et al. | 701/213 |
| 2009/0098821 A1* | 4/2009 | Shinya | 455/3.01 |

* cited by examiner

ENVIRONMENT MODIFICATION USING SYSTEM AND USAGE DATA

FIELD OF THE INVENTION

The present invention relates generally to software architecture. More specifically, environment modification using system and usage data is described.

BACKGROUND OF THE INVENTION

Graphical user interfaces ("UI") display information and data in a graphical manner, assigning icons, images, and other graphics to represent types and amounts of information. Rich Internet Applications ("RIA") and other architectural schemas may be used to provide applications that are "rich" or developed using extensive and comprehensive visual and aural effects. For example, conventional UIs use icons shaped like sealed envelopes on a cell, mobile, or smart phone display to represent messages (e.g., voicemail, text, instant) received. However, conventional UIs are limited with regard to the type and manner of presenting information in a UI that provides individual context and relevance for a user.

Conventional solutions do not accurately or efficiently present individually-tailored information associated with a user or device (e.g., mobile phone, smart phone, camera phone, mobile computing device, notebook computer, desktop computer, server, and other types of computing devices). Context and relevancy to an individual user are sacrificed in order to convey information using general techniques that are applicable to a user population at large. In other words, an envelope icon may be used to represent messages received for every user of a mobile phone, regardless of the type of device, software running on the device, network, or other environmental conditions. Different icons or presentation formats do not need to be developed for individual users. This technique is efficient for a network provider to use for an entire subscriber population, but individual users suffer from degraded user experiences, which also reduce the commercial attraction and value of the network service, devices, applications, service plans, and other aspects of device and system usage.

Further, conventional techniques that attempt to provider further customization for individual users rely upon the use of one-to-one correlations (e.g., one icon represents one voicemail message, two icons represent two messages, and so on) to present information and data graphically. While this technique may provide more detail, it is also inefficient because general one-to-one correlations do not account for differences in individual user behavior, preferences, characteristics, time, or system parameters.

Thus, presenting data and information on UIs without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

Techniques for environment modification using system and usage data are described. Computer programs, software, or applications ("applications") used to create or modify visual, graphic, audio, video, or other types of media content, presentations, and UIs (e.g., Flash® by Adobe Systems Incorporated of San Jose, Calif.) may be used to provide display environments ("environments") on devices that may be modified with usage data (e.g., user behavior, user preferences, historical performance, profile information and characteristics, device usage data (e.g., how many calls are made or received, how many messages are sent or received, types of applications used or launched by a given user, and the like)) and system data (i.e., data and information about a given user's device, including battery level, signal strength, network conditions affecting the device, available memory, power management settings, type of installed browser or microbrowser, operating system, other applications available on the device, and other conditions, parameters, characteristics, or attributes of a given user's device). An environment may be evolved (i.e., changed over time) by modifying an environment and its included elements (e.g., visual, audio, video, text, graphical, image, or other types of content or functionality included in an environment). Various types of themed environments are also described, including numerous examples for evolving an environment based on individual user behavior, system parameters and conditions, and other factors.

Figure 1A:
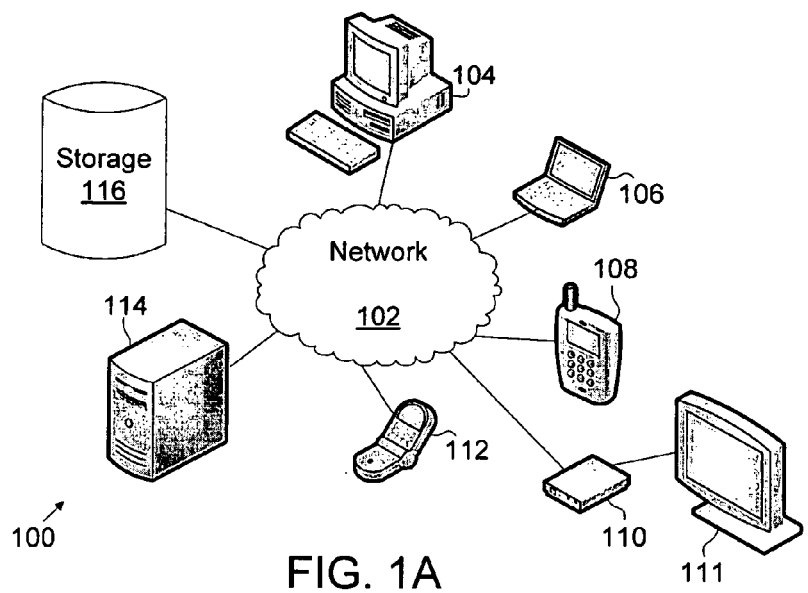
FIG. 1A illustrates an exemplary system for environment modification using system and usage data, in accordance with an example.

FIG. 1A illustrates an exemplary system for environment modification using system and usage data, in accordance with an example. Here, system 100 includes network 102, devices 104-114, and storage repository 116. As shown, devices 104-114 are represented by desktop computer 104, notebook (i.e., laptop) computer 106, mobile computing device 108, set top box 110 and display 111, mobile/cell phone 112, and server 114. Different types and quantities of devices may be used in alternative implementations and are not limited to the examples shown and described. Devices 104-114 are illustrative of various types of devices that may be used to implement applications that modify environments (e.g., graphical, visual, video, audio, text, haptic, and others) based on system and usage data. In some examples, devices 104-114 are coupled to network 102, which may be implemented as the Internet, World Wide Web, local area network (LAN), wide area network (WAN), municipal area network (MAN), or any other type of data network that may be implemented.

In some examples, applications developed for performing the described techniques for environment modification using system and usage data may be implemented on devices 104-114. System and usage data may be stored or retrieved from storage repository 116). In some examples, system data may include data, information, and parameters related to a given device. For example, system data associated with set top box 110 may include signal strength, data representing the types of content available, number of channels available due to network condition or subscription, and others. As another example, system data associated with mobile computing device 108 or mobile/cell phone 112 may include signal strength, network availability or conditions, battery/power level, available services, and others. In some examples, usage data may be collected from devices 104-114 and stored either locally on the device or remotely on, for example, storage repository 116. Alternatively, storage repository 116 may also be implemented as local storage on devices 104-114. Storage repository 116 may be implemented using one or more storage devices, databases, data warehouses, datamarts, arrays (e.g., redundant array of independent disks (RAID)), storage networks (e.g., storage array network (SAN), and the like), and others. In other examples, system 100 and the illustrated elements (e.g., network 102, devices 104-114 and storage repository 116) may be implemented differently and are not limited to the examples shown.

Figure 1B:
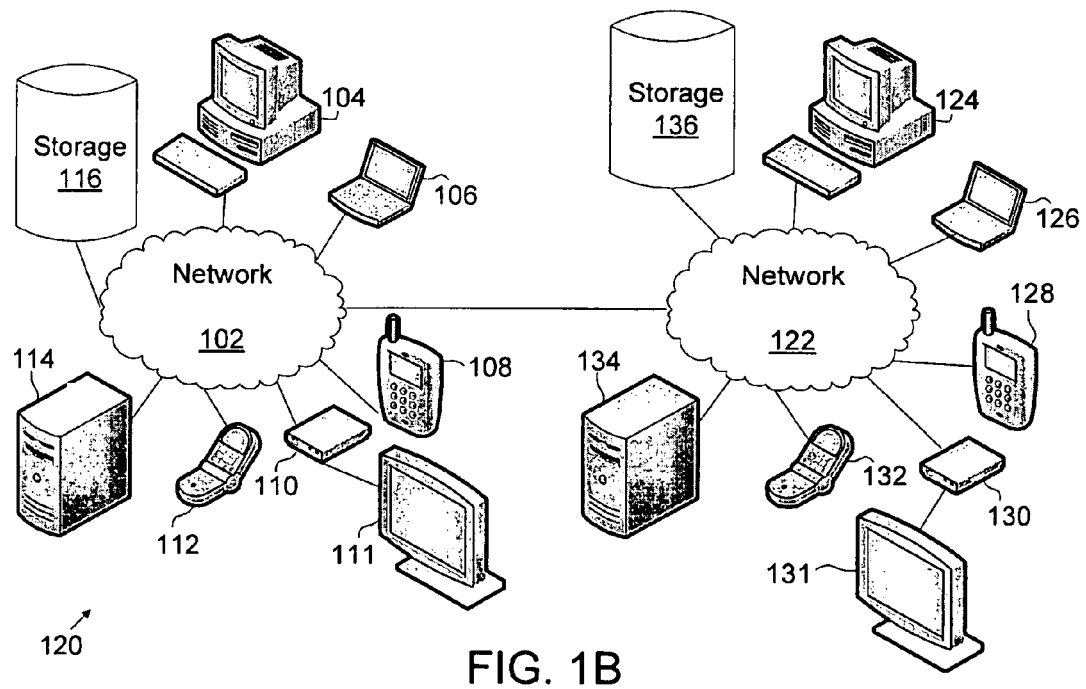
FIG. 1B illustrates an alternative exemplary system for environment modification using system and usage data, in accordance with an example.

FIG. 1B illustrates an alternative exemplary system for environment modification using system and usage data, in accordance with an example. Here, system 120 also includes network 102, devices 104-114, and storage repository 116. As described in FIG. 1A, devices 104-114 includes desktop computer 104, notebook (i.e., laptop) computer 106, mobile computing device 108, set top box 110 and display 111, mobile/cell phone 112, and server 114. In addition to the above-described components, system 120 also includes network 122, devices 124-134, and storage repository 136. In some examples, network 102 may be coupled via direct or indirect data communication links to one or more other networks (e.g., network 122) coupled to additional devices (e.g., devices 124-134) running applications configured to modify environments on their respective devices. In some examples, one, some, all, or none of devices 104-114 and 124-134 may have applications configured to modify environments installed. In other examples, system 120 and the illustrated elements (e.g., networks 102, 122, devices 104-114 and 124-134, storage repositories 116 and 136) may be implemented differently and are not limited to the examples described.

Figure 2A:
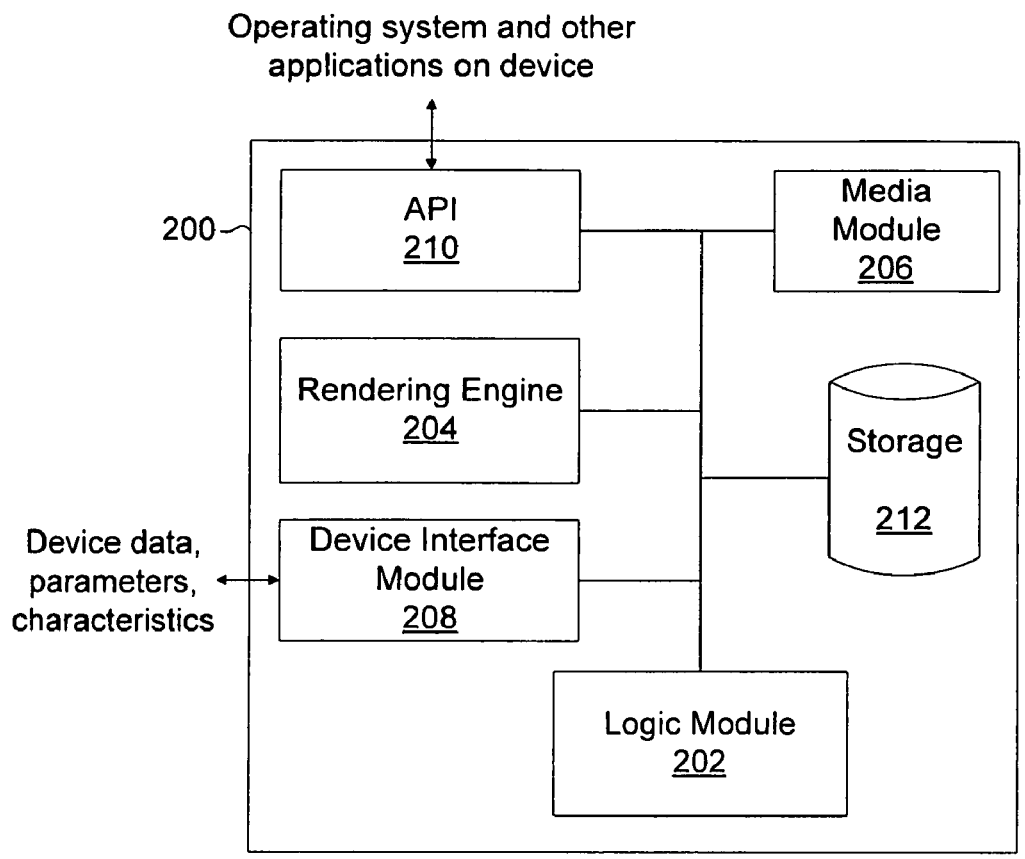
FIG. 2A illustrates an exemplary application for environment modification using system and usage data, in accordance with an example.

FIG. 2A illustrates an exemplary application for environment modification using system and usage data, in accordance with an example. Here, application 200 includes logic module 202, rendering engine 204, media module 206, device interface ("I/F") module 208, application programming interface ("API") 210, and storage 212. In some examples, storage 212 may be a local storage repository or memory implemented on a device running application 200. In other examples, storage 212 may be implemented as part of application 200 (as shown) or as a separate element included on the same device as application 200. Further, application 200 may be implemented as part of another application or as a separate application in data communication with other applications (e.g., operating systems, applications, visual or Rich Internet Applications ("RIA"), and others) using API 210. Application 200 may be implemented as software, hardware, circuitry, or a combination thereof. If implemented as software, application 200 may be developed using structured (e.g., object-oriented, and others) or unstructured programming and formatting languages such as C, C++, C#, Java, .Net, Cobol, Fortran, machine assembly, HTML, XML, XHTML, and any others. The type of programming or formatting language used is not a limitation of the examples shown and may be varied.

In some examples, logic module 202 provides control logic that directs application 200 to modify environments using system data and usage data. Logic module 202 may initiate calls of other applications (not shown) using application programming interface 210 to retrieve system and/or usage data. System and usage data may also be called from a device using device interface module 208. System and usage data may be stored in or retrieved from storage 212. Examples of processes performed by application 200 and logic module 202 are described in greater detail below in connection with FIGS. 6-7.

Referring back to FIG. 2A, system and usage data may also be used to implement or download an environment. In other words, an environment may be configured as a system or set of system files that, when downloaded to a device, may be implemented. For example, a garden environment may be configured as a set of system files (e.g., system data) that may be downloaded by application 200 and stored to storage 212. When logic module 202 retrieves the set of system files, rendering engine 204, media module 206, and device interface module 208 generate a garden environment on the display of a device. Users may also download additional system and usage data (i.e., from a server or other remote source) to add elements to the environment, allowing users to customize an environment for their personal tastes and preferences. For example, if a user wishes to add a particular type of hydrangea or shrub to the environment, application 200 may be used to download additional system data (i.e., set of system files) that would be used to modify the environment on her device. As another example, if a landscape-themed environment is presented and a user wants to add the Sydney Opera House to an urban environment, application 200 may be used to download and add the desired element to the environment of his device. Further, application 200 may be used to configure, evolve, or further modify elements (e.g., downloaded, default/factory-installed, shared, beamed, transferred, or other types of elements) in response to usage data.

For example, a downloaded hydrangea element may be configured to represent voice messages from a recognized caller. As the number of messages changes (i.e., are received from the recognized caller, deleted, stored, archived, added, modified, and the like), the hydrangea element may be configured to grow, expand, or contract. As another example, as messages are received from a recognized caller in the above example involving the Sydney Opera House, foot traffic or pedestrians milling about the Sydney Opera House may increase. As messages are deleted or store elsewhere (i.e., archived), the foot traffic may diminish. Likewise, other aspects including audio and video-related aspects may also be configured to change or evolve with time as activity occurs (e.g., noise emanating from a downloaded element may change in volume, tone, rhythm, and the like). By downloading system files, new content and functionality may be added to environments or new environments may be installed or used to replace other environments. Elements may be configured to react to further system and usage data that is received over time. In other examples, downloaded system data may be configured differently and is not limited to the examples described above.

Here, logic module 202 may also include rules or parameters (i.e., user and/or system-specified) that may be used to evaluate system and usage data. System and usage data may be accumulated for evaluation to identify trends associated with an individual user. In some examples, rules or parameters may also change with system or usage data changes. For example, if a user turns her phone off, a rule may specify that usage data levels are reset and, when the phone is turned on, data begins to accumulate from a zero balance. Examples of rules or parameters may include determining how much a device is used, device performance, the ratio of talk time to callers (e.g., total talk time (minutes)/total callers), current values for battery/power level and signal strength (i.e., based on ranges within a wireless or telecommunications network), general usage range (e.g., average initial usage (minutes)/ general usability (minutes), expressed as a ratio or real number), an individual usage profile in relation to an overall usage population, how to incorporate changes with artwork rendered for a UI, and others. Rules may also be randomized, used to indicate combinations of current or mean system or usage data values (described in greater detail below), or other guidance for application 200.

Logic module 202 calls for system and usage data from a device that application 200 may be running on locally. When system and usage data are returned, they are evaluated to determine what and how an environment on a device should be modified. When changes have been determined, as described in greater detail below, logic module 200 directs rendering engine 204 to modify elements (e.g., graphics, images, photos, video, audio, avatars, icons, and other UI displayed elements) based on the changes. Changes are based on the system and usage data of an individual user and device, not a mobile phone population at large. Environment modification by application 200 may be performed based on the individual user characteristics and behavior of a given user. For example, if a user receives 20 calls in a month on average, then icons or graphics that indicate his call volume may be modified to reflect his actual call volume (i.e., current usage value) in relation to his mean call volume (i.e., mean usage value). Thus, a caller with a 20-call monthly volume may have an environment that is different from another caller with a 500-call monthly volume, each of which has an environment that has been modified based on their individual system and usage data. Examples of modified elements are discussed in greater detail below in connection with FIGS. 3-5.

Here, environments may be implemented and modified on a device display (e.g., devices 104-114, 124-134 (FIGS. 1A-1B)) using information in files stored in or retrieved from storage 212. Presentation of environments and elements within the environment (e.g., graphics, images, video, audio, and others) may be performed by rendering engine 204 and media module 206, which handles device displays, UIs, sounds, text, and appearance or presentation of various types of media on a device. Data may be output using device interface module 208, which directs the presentation of an environment and its associated elements, modified or otherwise, on a device. Files may be compilations or collections of data that, when loaded and run, provide parameters, characteristics, formatting, values, and other information for rendering an environment (i.e., using rendering engine 204). In other examples, application 200 and the elements shown may be implemented using more, fewer, or different modules and are not limited to the examples described.

Figure 2B:
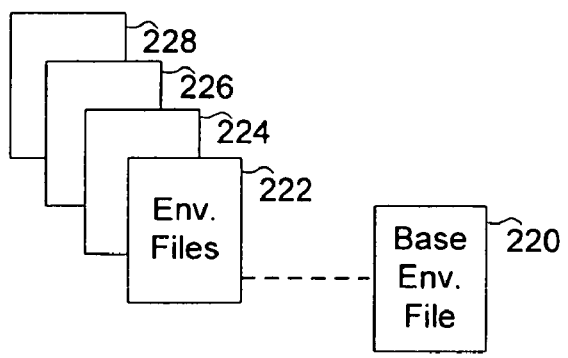
FIG. 2B illustrates exemplary data structures used for environment modification using system and usage data, in accordance with an example.

FIG. 2B illustrates exemplary data structures used for environment modification using system and usage data, in accordance with an example. Here, base environment file 220 and environment files 222-228 are shown. In some examples, base environment file 220 and environment files 222-228 may be data structures (e.g., Flash® files) housing data (e.g., colors, fonts, values, formats and formatting data, templates, windows, and the like) for determining the presentation of an environment on a device, display, UI, or the like. Here, base environment file 220 and environment files 222-228 may be sent to storage 212 (FIG. 2A) and retrieved by rendering engine 204 (FIG. 2A) and other components of an application (e.g., application 200 (FIG. 2A)) to create, modify, or otherwise display an environment.

In some examples, base environment file 220 may also include logic that guides and directs the use of data stored in environment files 222-228. When base environment file 220 is extracted, logic stored in the file directs the retrieval of data from environment files 222-228 that rendering engine 204 (FIG. 2A) may use to determine what elements of an environment are displayed and the manner in which the elements are displayed. For example, a landscape environment may be presented on a device using base environment file 220 and environment files 222-228. When base environment file 220 is extracted from storage 212, it directs the retrieval of environment files 222-228 that provide, for example, the background or backdrop appearance ("background") of the environment, elements within the environment (e.g., trees, bushes, flowers, birds, clouds, sun, and the like), and formatting for the environment in relation to a given device in use. Base environment file 220 and environment files 222-228 may also include information that is used to determine how the elements and background are coupled to functionality presented in the environment (e.g., selecting a "bird" icon to retrieve a message, sizing or re-sizing the "sun" based on the battery/power level of a device, and the like). Environment files may also be configured to store personalization data for an individual user that enables customization of the environment for an individual user. Backgrounds may be implemented to provide a base environment and application 200 may use system and usage data to implement the techniques described herein for environment modification. In other examples, base environment file 220 and environment files 222-228 may be implemented differently and are not limited to the examples shown.

Figure 3A:
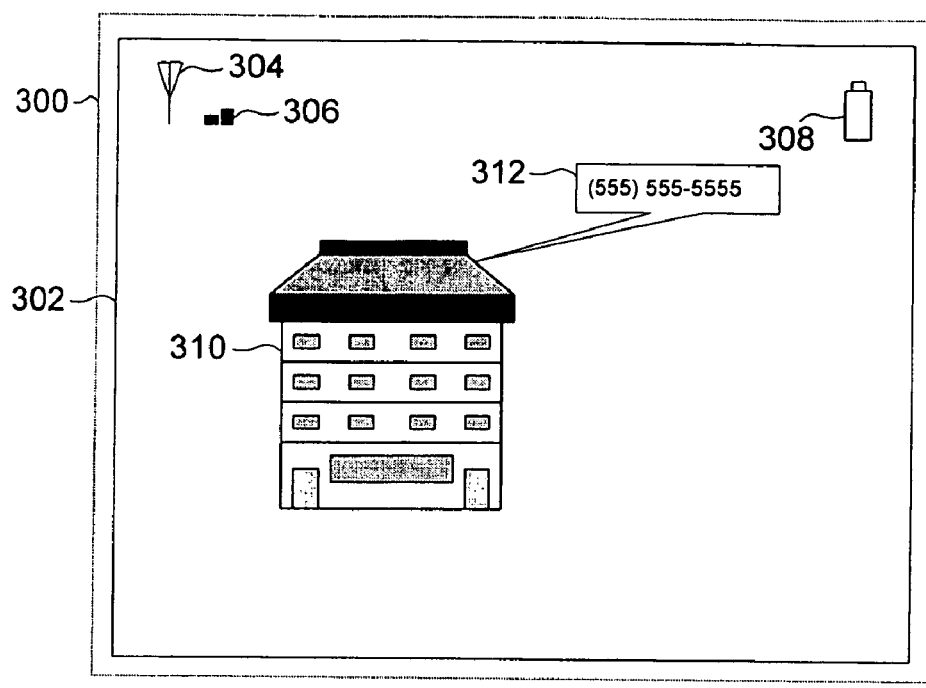
FIG. 3A illustrates an exemplary environment using system and usage data, in accordance with an example.

FIG. 3A illustrates an exemplary environment using system and usage data, in accordance with an example. Here, display 300 includes environment 302, mode element 304, signal strength element 306, battery indicator 308, message element 310, and callout 312. In some examples, display 300 may be implemented on a device such as a smart phone, mobile phone, cell phone, PDA or other type of mobile/wireless computing device. Examples of elements used to display system data include mode element 304, which shows the type of mode that the device and environment are using (e.g., wireless, "connected," "disconnected," and the like). Other examples of elements used to display system data include signal strength 306, and battery indicator 308 (shown here as transparent, which indicates a battery/power level of "low"). Examples of usage data may be displayed by using message element 310 and call out 312.

Here, display 302 shows message element 310, which appears as an image of a building. In some examples, message element 310 may be configured to appear like a building in a cityscape. Cityscapes may be used as themes for environment 302 and configured to represent cities such as Paris, Rome, London, Tokyo, New York, San Francisco, and others. Environment 302 may be used with cityscapes representing other cities and types of urban or rural settings and are not limited to the examples listed above. Here, message element 310 represents a single message received from a caller whose telephone number is shown. In other examples, message element 310 may represent more than one caller if, for example, the individual user receives numerous messages and it would be more appropriate to use message element 310 to represent a group, collection, or archive of messages.

In some examples, message element 310 may be configured to represent a voicemail message and the height of the building may also be used to represent the size or length of the voicemail message. As message element 310 ages (i.e., the amount of time the message remains in an individual user's message inbox), the building may also be moved further into the background, appear to age (e.g., overgrowth begins growing on the building, brightness of lights in the building are adjusted, message element 310 appears dimmer or eventually fades, and the like), or shrink in size as newer messages are received. In other examples, message element 310 may be modified in various dimensions, including size, shape, height, age (i.e., date and time received), and others to customize environment 302 for an individual user. In other words, message element 310 may be "evolved" or modified over a given time period based on the system and usage data of an individual user. Here, a single building may be used to represent a single voicemail in a user's inbox, with callout 312 displaying the number of the caller who left the message. In other examples, callout 312 may include a caller identity, text associated with the message or the caller, or other information about the message. Environment 302 and the elements shown may be varied and are not limited to the example described. Further, environment 302 may be modified such that elements (e.g., message element 310) appear to evolve over time.

Figure 3B:
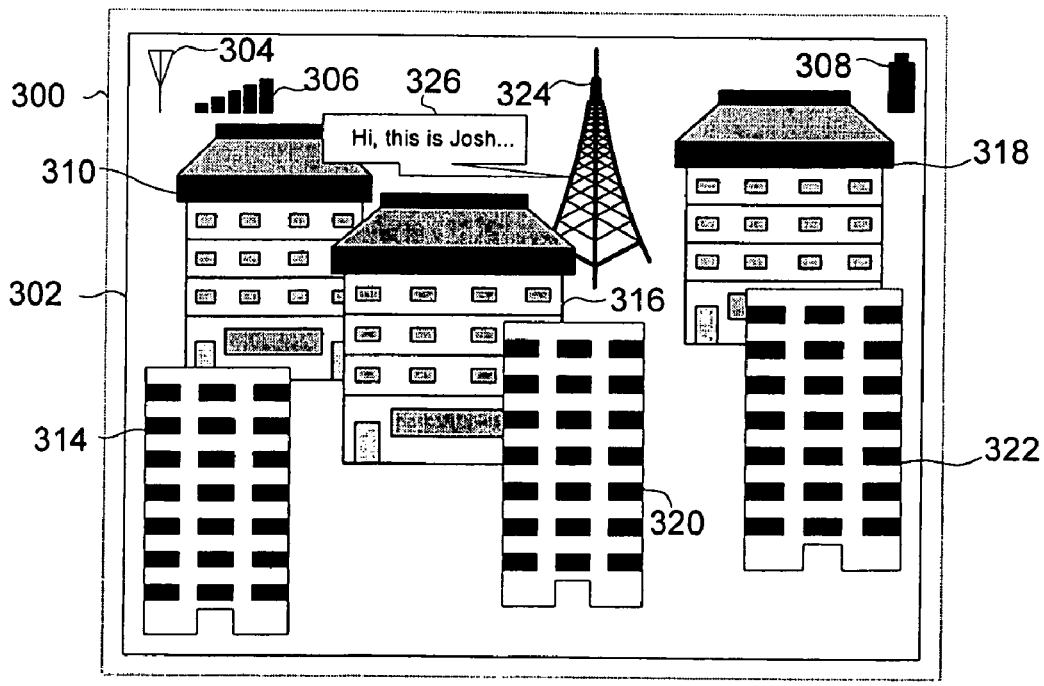
FIG. 3B illustrates an exemplary environment modified using system and usage data, in accordance with an example.

FIG. 3B illustrates an exemplary environment modified using system and usage data, in accordance with an example. Here, display 300 presents environment 302, which includes mode element 304, signal strength element 306, battery indicator 308, message elements 310, 314-322, text message element 324, and callout 326. Examples of elements used to display system data include mode element 304, which shows the type of mode that the device and environment are using (e.g., wireless). Other examples of elements used to display system data include signal strength 306 (shown here as "strong" with five bars of ascending height), and battery indicator 308 (shown here as opaque for "high" or "fully charged"). Environment 302 may be configured to appear as a "cityscape" or urban scene and, in some examples, may be configured to represent either a general city setting or a more distinctive city setting, such as New York, Paris, London, Rome, Tokyo, Moscow, Santa Clara, or the like. As system usage increases and system data and usage data are accumulated, environment modifications may be made to customize environment 302 for an individual user. For example, as the number of messages increase, the quantity of message elements 310, 314-322 may be decreased because environment 302 is adapted to account for increasing call usage without rendering display 302 in a "cluttered" state. In some examples, more, fewer, or different elements may be implemented in environment 302.

Here, message elements 310, 314-322 may be graphical icons, avatars, symbols, or other types of elements used to represent messages received by a mobile phone user. Buildings in the foreground (e.g., message elements 314, 320, and 322) may be used to represent recently-received messages and those in the background (e.g., message elements 310, 316, and 318) may represent older messages. Further, different shapes may also be used to represent different types of messages. Here, text message element 324 may be used to represent a text message received from another user. In other examples, different shapes of buildings may also be used to represent different types of messages (e.g., text, audio, pictures, images, video, streaming, musical, messages with attachments and others). Messages may be identified by callout 326, which may indicate whether a message is a voicemail message (i.e., a telephone number is displayed), a text message (some of the introductory text or the identification of the sender (i.e., sender's handle or username) is shown), a picture, or the like. In other examples, portions of a message may be displayed or rendered audible, if audio-based. In still other examples, different types of message elements may be used instead of those shown. For example, billboards may be used to represent messages, displaying senders' names, numbers, usernames, and the like. Environment 302 and the elements shown may be varied and are not limited to the examples described above.

Figure 4A:
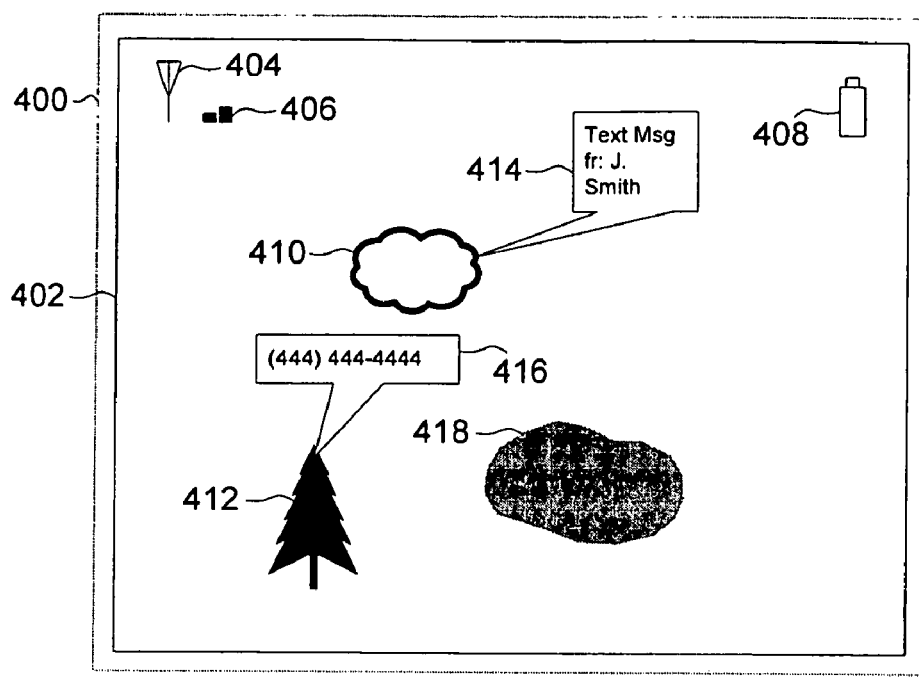
FIG. 4A illustrates an alternative exemplary environment using system and usage data, in accordance with an example.

FIG. 4A illustrates an alternative exemplary environment using system and usage data, in accordance with an example. Here, display 402 includes environment 402, mode element 404, signal strength element 406, battery indicator 408, text message element 410, voice message element 412, callouts 414-416, and graphical element 418. In some examples, test message element 410 is shown with callout 414, alerting a user to a text message from "J. Smith." Voice message element 412 is also shown with callout 416, indicating a voicemail message from telephone number "(444) 444-4444." Here, voice message element 412 is displayed as a small tree, which may grow or move into the background of environment 402 as time passes and other messages are received. Further, the size of voice message element 412 may be adjusted based on the length or duration of the voicemail message it represents.

As another example, text message element 410 is shaped like a cloud. Callout 414 displays some information about text message element 410, indicating the sender of the text message. Text message element 410 may be varied in size and shape to account for the size of the message, attachments, or other parameters.

Yet another example, graphical element 418 may be used to convey other information about an individual user and device. For example, graphical element 418 may be displayed as a lake configured to represent a group or pool of messages resident in the user's inbox. In some examples, graphical element 418 (i.e., the lake) may contract or expand as messages are received or deleted from the user's inbox. Further, by using system and usage data, graphical element may be customized for an individual user to represent her user behavior, call usage, quantity of messages received, saved, or deleted.

System and usage data may be compared against mean data (i.e., mean usage value, mean system value) and graphical element 418 may be sized accordingly. In some examples, mean usage values may refer to mean values determined by evaluating an individual user's behavior, preferences, or history over a period of time to yield an average value that may be assigned or applied to individual data points in a set of usage data. Likewise, mean system values may refer to mean values assigned to means values determined by evaluating system parameters, characteristics, and other operating data over a period of time. A mean system value may then be applied to individual data points within a set of system data. By using mean usage values and mean system values, an individual user's behavior may be reflected in modified elements (i.e., text message element 410, voice message element 412, graphical element 418) to evolve environment 402 and the other environments described herein (e.g., environment 302 (FIG. 3)). In other examples, environment 402 may be described differently with more, fewer, or different elements and is not limited to the examples described above.

Figure 4B:
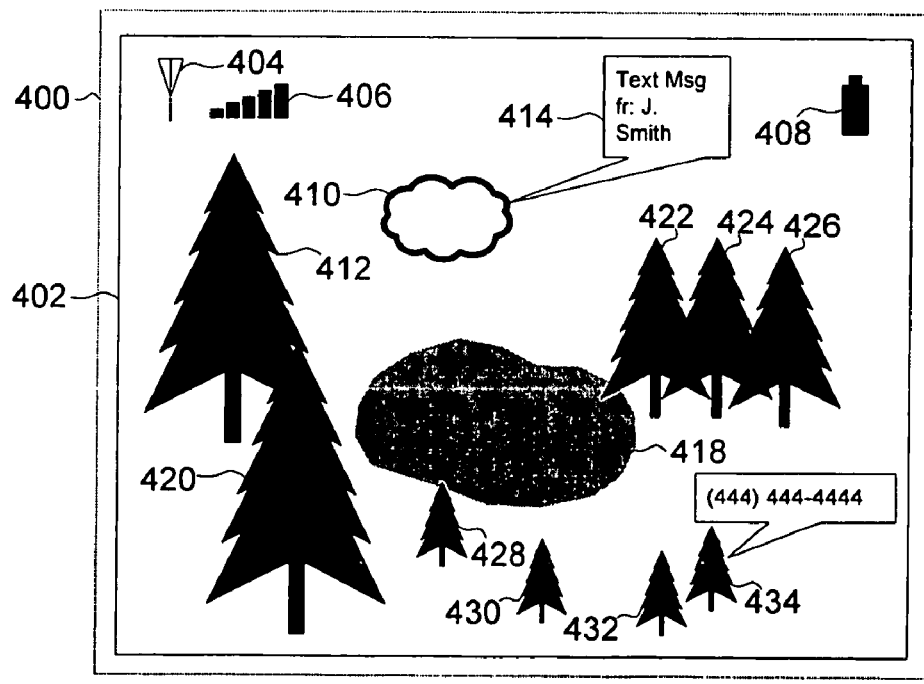
FIG. 4B illustrates an alternative exemplary environment modified using system and usage data, in accordance with an example.

FIG. 4B illustrates an alternative exemplary environment modified using system and usage data, in accordance with an example. Here, display 402 includes environment 402, mode element 404, signal strength element 406, battery indicator 408, text message element 410, voice message elements 412, 420-434, graphical element 418, and callouts 414 and 434. In some examples, elements (e.g., text message element 410, voice message elements 412, 420-434, graphical element 418) may be modified based on changes between current and mean system and usage data values.

In some examples, voice message element 412 may be displayed to represent a voice message received by a user. As additional voice messages are received, the sizes of voice message elements 420-434 may be modified to graphically represent when voice messages are received. Further, the size of each of voice message elements 420-434 may be modified based on when voice messages are received, the size of each voice message, and aging of each voice message. In some examples, aging may refer to the length of time that passes before a voice message is reviewed by a user. Voice message element 412 may "grow" or expand in size as the amount of time between reception and review grows. In other words, voice messages may be represented by elements that appear to "grow" or change over time (i.e., evolve). For example, voice message element 412 appears larger than other voice message elements 420-434. Alternatively, age may be based on the relative length of time that a message has been received, but not reviewed. In other examples, elements may be modified differently and are not limited to the examples shown and described. In still other examples, environment 402 may be implemented differently, using different themes, contexts, backgrounds, and other elements.

Figure 5A:
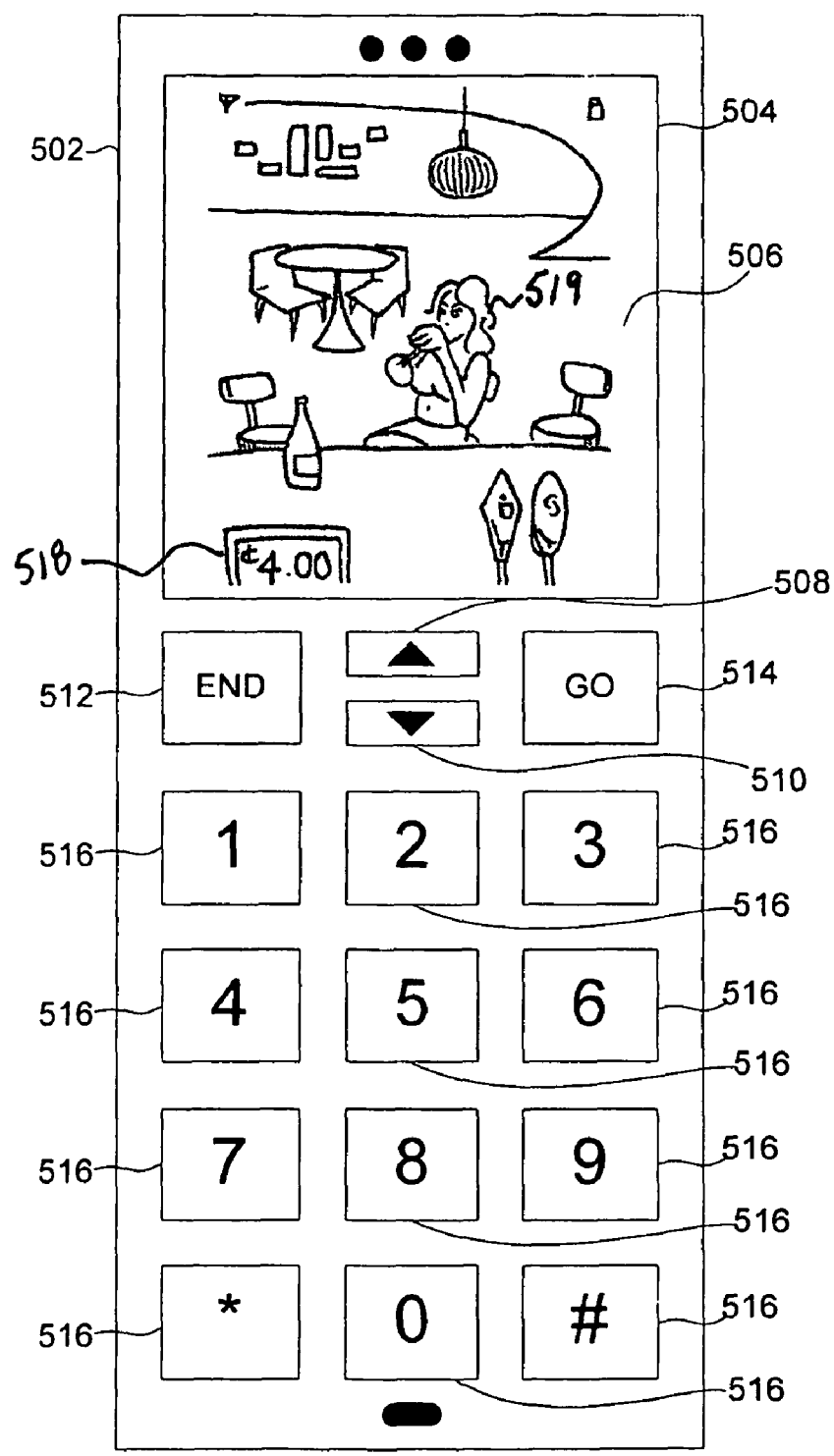
FIG. 5A illustrates another exemplary environment using system and usage data, in accordance with an example.

FIG. 5A illustrates another exemplary environment using system and usage data, in accordance with an example. Here, device 502 includes, environment 504, bar theme 506, scroll buttons 508-510, END button 512, GO button 514, and dial-pad buttons 516. Device 502 may be a mobile communications device such as a cell phone, smart phone, PDA, or the like. Device 502 may also be implemented differently using other types of devices and the examples described are not limited to any particular hardware environment as application 200 (FIG. 2A) may be implemented using various types of software, hardware, circuitry, or a combination thereof. In some examples, environment 504 may be implemented using bar theme 506. Various elements within environment 504 may be modified to evolve consistently within bar theme 506. For example, as calls are made or received, a pre-paid calling card amount may be decremented or incremented. A pre-paid calling card amount may be shown in tab 518. Further, if a call or message is received from a recognized caller, the tone, attitude, or other characteristic of avatar 519 may also be modified to reflect changes based on system and usage data that is related to the device user.

Figure 5B:
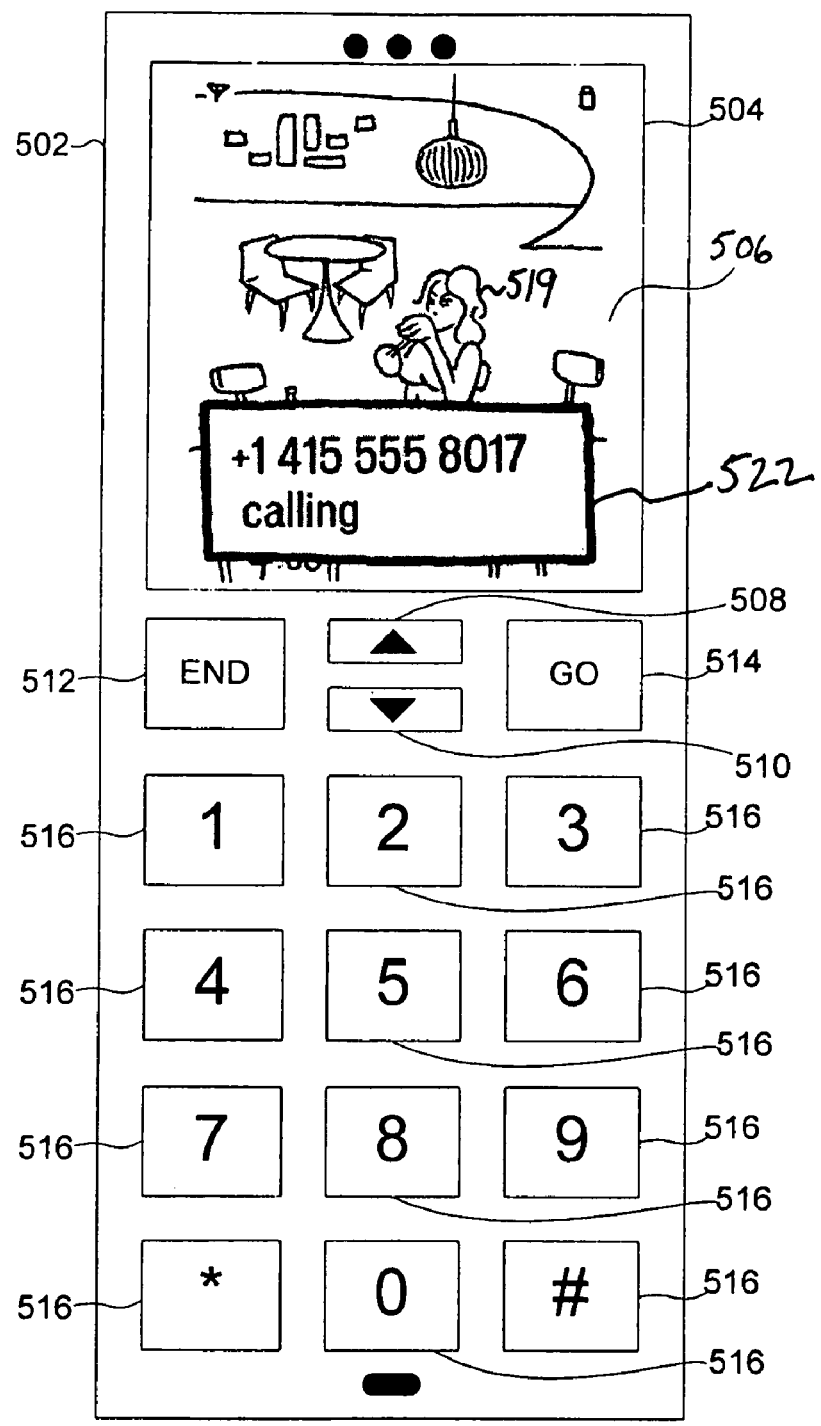
FIG. 5B illustrates another exemplary environment modified using system and usage data, in accordance with an example.

FIG. 5B illustrates another exemplary environment modified using system and usage data, in accordance with an example. As another example, window 524 may appear when a call is received, displaying the number of the calling user. Further, if the number of the calling user is recognized (e.g., stored in local memory by the user), avatar 519 may be modified to reflect a friendly tone, attitude, gesture, or the like. If the calling number is not received, avatar 519 may be modified to display a neutral, unfriendly, or untoward tone, attitude, gesture, or the like. In still other examples, environment 504 may be implemented using theme 506 differently and is not limited to the example shown.

Figure 5C:
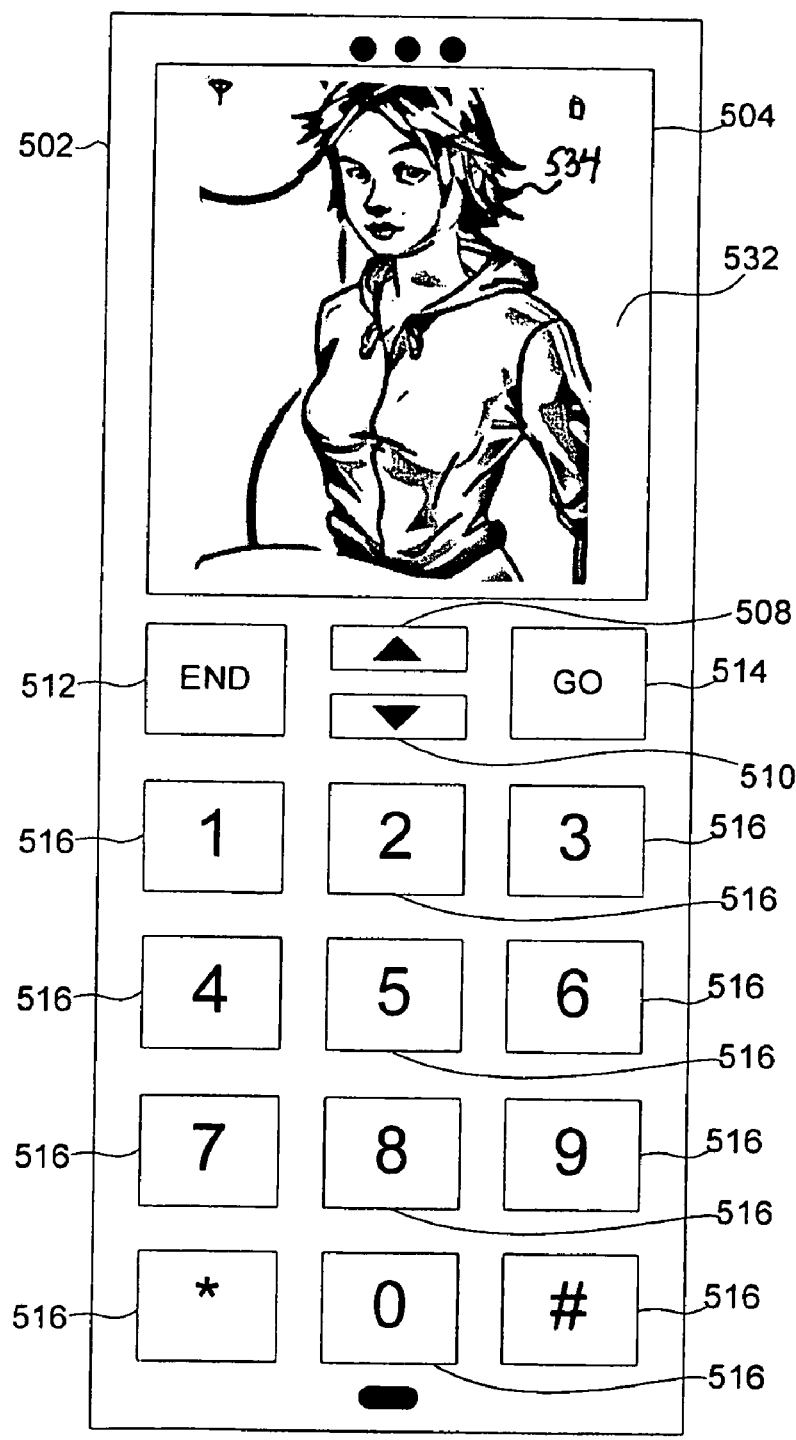
FIG. 5C illustrates another alternative exemplary environment using system and usage data, in accordance with an example.

FIG. 5C illustrates another alternative exemplary environment using system and usage data, in accordance with an example. Here, environment 504 may be implemented with avatar theme 532. In some examples, avatar theme 532 may be implemented using an image, photo, or graphic of a "virtual" character where clothing, facial expressions, physical characteristics (e.g., hair, eye, skin color, hair length, bodily dimensions, and the like), and background may be modified based on system and usage data collected from device 502. For example, elements within environment 504 may be modified within avatar theme 532 to display avatar 534 in morning clothes (i.e., sweat suit or workout clothing) with a rested expression. Throughout the day, system and usage data are collected on device 502 to determine whether changes to elements within environment 504 are modified.

Figure 5D:
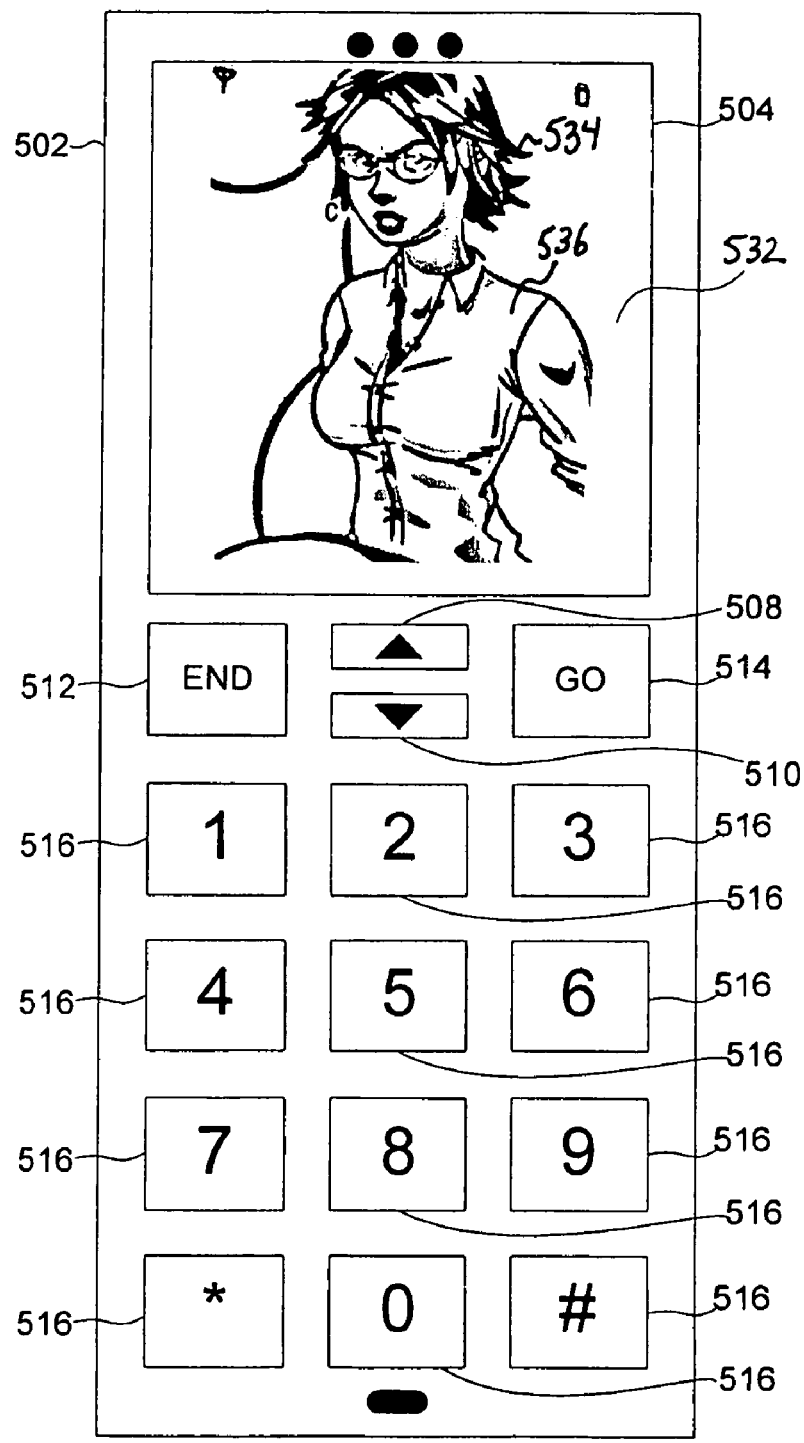
FIG. 5D illustrates another alternative exemplary environment modified using system and usage data, in accordance with an example.

FIG. 5D illustrates another alternative exemplary environment modified using system and usage data, in accordance with an example. Here, avatar 534 may be modified to reflect changes from environment 504 shown in FIG. 5C. In some examples, a change in system and/or usage data may be used to modify elements (e.g., avatar 534) associated with environment 504. For example, a change in time and day may be used to modify the clothing, facial appearance, tone, or body language of avatar 534. Professional clothing, facial appearance, tone, or body language for avatar 534 may be modified for a mid-day appearance emulating the appearance of avatar 534 being "dressed" for work or her employment. Avatar 534 may be further modified using system and usage data as the day continues, modifying her clothing, facial appearance, tone, body language, or other characteristics and that of environment 504 to reflect, for example, fatigue later in the day. As another example, avatar 534 may be modified to wear evening attire (e.g., pajamas, nightgown, formal wear), have a tired or fatigued countenance, "tired" body tone or language, or other physical characteristics that may be modified to reflect an evening setting, based on system data that, when called by application 200 (FIG. 2A), provides data for time and day. Further, user behavior may be used to modify avatar 534.

For example, if a user receives a call from a number associated with avatar 534, environment 504 may be modified to reflect a change to the appearance of avatar 534. In other examples, e-mails, text messages, voicemails, attachments, images, and the like may be used instead of calls. Here, when the call is first received, avatar 534 may be modified to reflect a smile on her facial appearance. However, as each subsequent ring on device 502 occurs, the facial appearance on avatar 534 is modified to reflect a diminishing smile until the call is routed to the user's voicemail inbox. When routed to the user's voicemail inbox, system data may be used to modify the appearance of avatar 534 to provide an unhappy, unsatisfied, grimacing, or otherwise unhappy countenance. As a further example, if additional unanswered calls are received, avatar 534 may be further modified to reflect an angry appearance or other elements on environment 504 may be further modified (e.g., avatar 534 breaks background items (e.g., dishes, cups, windows, and the like), presents a distressed appearance, or the like). Other modifications to avatar 534 and other elements in environment 504 may be made and are not limited to those described above.

As another example, other callers may have other avatars stored in memory locally and, when calls are received from other callers, avatar 534 is modified to show a different avatar or image. Usage data reflecting user-specified preferences as to which avatar or image is associated with callers stored in memory on device 502 may be created, modified, stored, or deleted by the user. Still further, system data and usage data may be combined to further modify elements of environment 504 (e.g., avatar 534) by determining mean values (e.g., a mean system value for the voicemail inbox data size or capacity, a mean usage value for the number of received calls accumulated by the user on a monthly basis, or the like) and current values (e.g., the actual or current amount of voicemail inbox data (i.e., actual amount of voicemails stored), actual number of received calls accumulated by the user for the given month, actual number of received calls from a given number or recognized caller, or the like). By dividing current values by mean values, actual values may be determined and applied to modify data that, when rendered by application 200 (FIG. 2A) causes changes to elements in, for example, environment 504. In other examples, different sources or types of system and usage data may be used and the techniques described herein are not limited to the examples shown. Further examples of environments that may be implemented and modified using the techniques described above are shown.

Figure 5E:
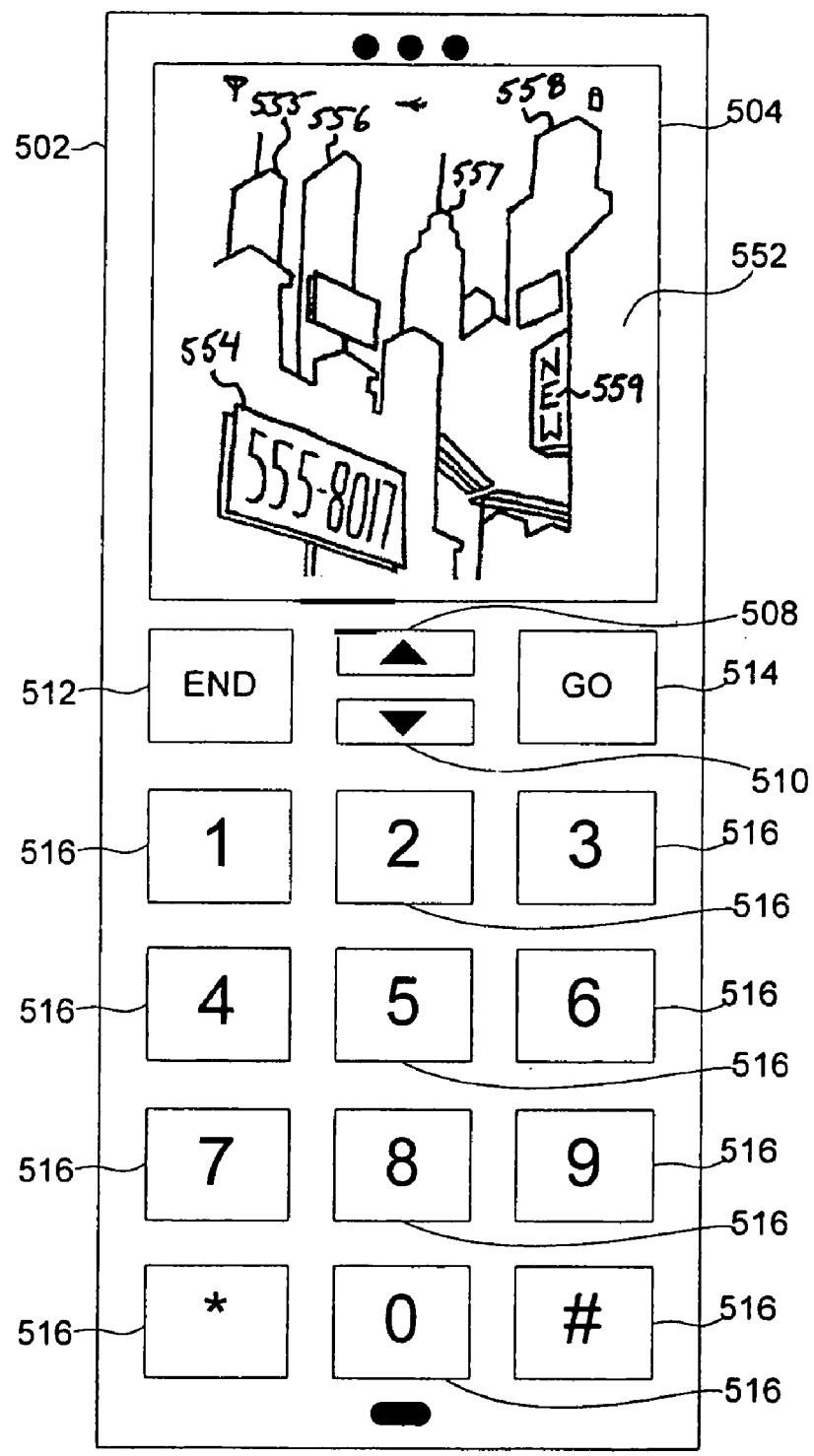
FIG. 5E illustrates yet another alternative exemplary environment using system and usage data, in accordance with an example.

FIG. 5E illustrates yet another alternative exemplary environment using system and usage data, in accordance with an example. Here, environment 504 is displayed with cityscape theme 552, including billboard 554, buildings 555-558, and status indicator 559. In some examples, when calls or messages received by a user occur, billboard 554 may be configured to display the calling number and status indicator 559 may be configured to display information associated with the caller (e.g., whether the call is "new" or "old," whether the caller is recognized or "unknown," whether the call, message, e-mail, or other communication is "normal" or "urgent," and the like). As calls are received and routed to voicemail, if a message is left, then another element (e.g., buildings 555-558) may be presented in the background. As more calls are received, environment 504 is developed further in accordance with cityscape theme 552. In other words, buildings may be used to represent one or more voicemails, messages, or the like received by a user and as subsequent voicemails, messages, or the like are received, previously-received elements (i.e., buildings 555-558) are pushed up and into the background, thus showing a rising "skyline" or developing urban setting. Further, the activity of the individual user may be used to determine the rate of development or "urbanization" of environment 504 using the cityscape theme. In some examples, a one-to-one correlation (i.e., one building element representing one message, voicemail, or the like), average (i.e., mean) call volume may be used to determine whether the actual rate of messages, voicemails, or the like warrants more or less modification of environment 504. Thus, environment 504 may develop at different rates during different times based on actual system and user activity (i.e., differing system and usage data).

Figure 5F:
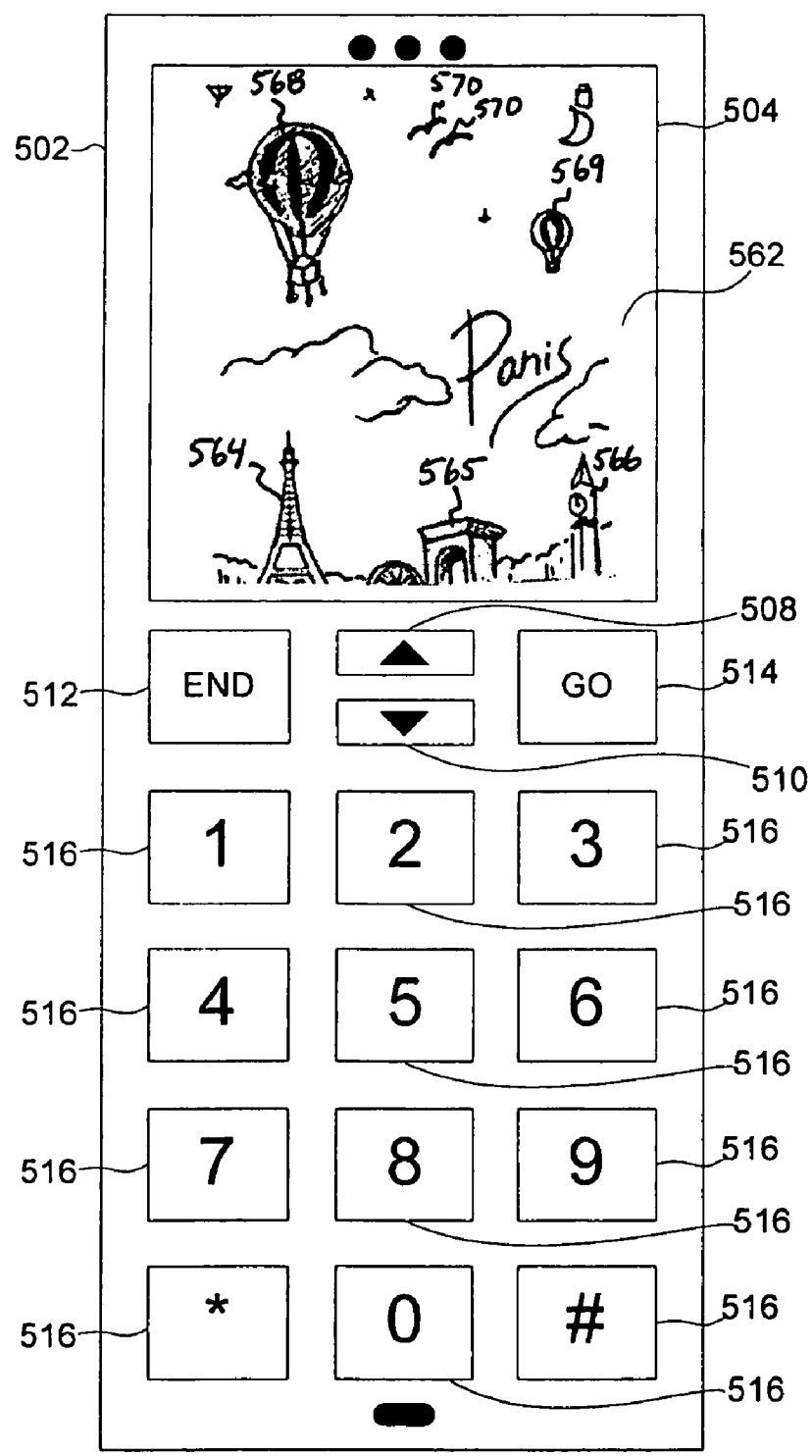
FIG. 5F illustrates still another alternative exemplary environment using system and usage data, in accordance with an example.

FIG. 5F illustrates still another alternative exemplary environment using system and usage data, in accordance with an example. Here, environment 504 is displayed using geographic locale theme 562 having elements 564-569. In some examples, geographic locale theme 562 may be configured to display representations of different cities (e.g., Paris, Rome, Berlin, New Delhi, Tokyo, San Francisco, and others). Using elements 564-569, which are associated with landmarks such as the Eiffel Tower, the Arc d'Triomphe, and the Cathedral of Notre Dame, environment 504 may be displayed as a setting that may be identified, but customized for an individual user. For example, received calls, messages, or e-mails may be displayed using element 566. In some examples, element 568 is shaped like a balloon and, as messages are received, the balloons may be moved into the background (e.g., element 569). Further, older messages may be represented as birds (e.g., elements 570). Still further, as older messages accumulate, with respect to mean system and usage values, the quantity of elements 570 (i.e., "birds") may be varied such that a single instance of element 570 may represent one or more messages. In other words, elements 570 may be used to represent an archive of older messages that, when selected by a user from a UI using environment 504, an index of messages represented by the bird (i.e., element 570) may be presented. This technique allows for a greater than one-to-one correlation of messages-to-elements ratio and instead introduces a one-to-many structure for organizing information and data within environment 504 using individual system and usage data. In other examples, environment 504 may be implemented or modified differently and is not limited to the examples described above.

Figure 5G:
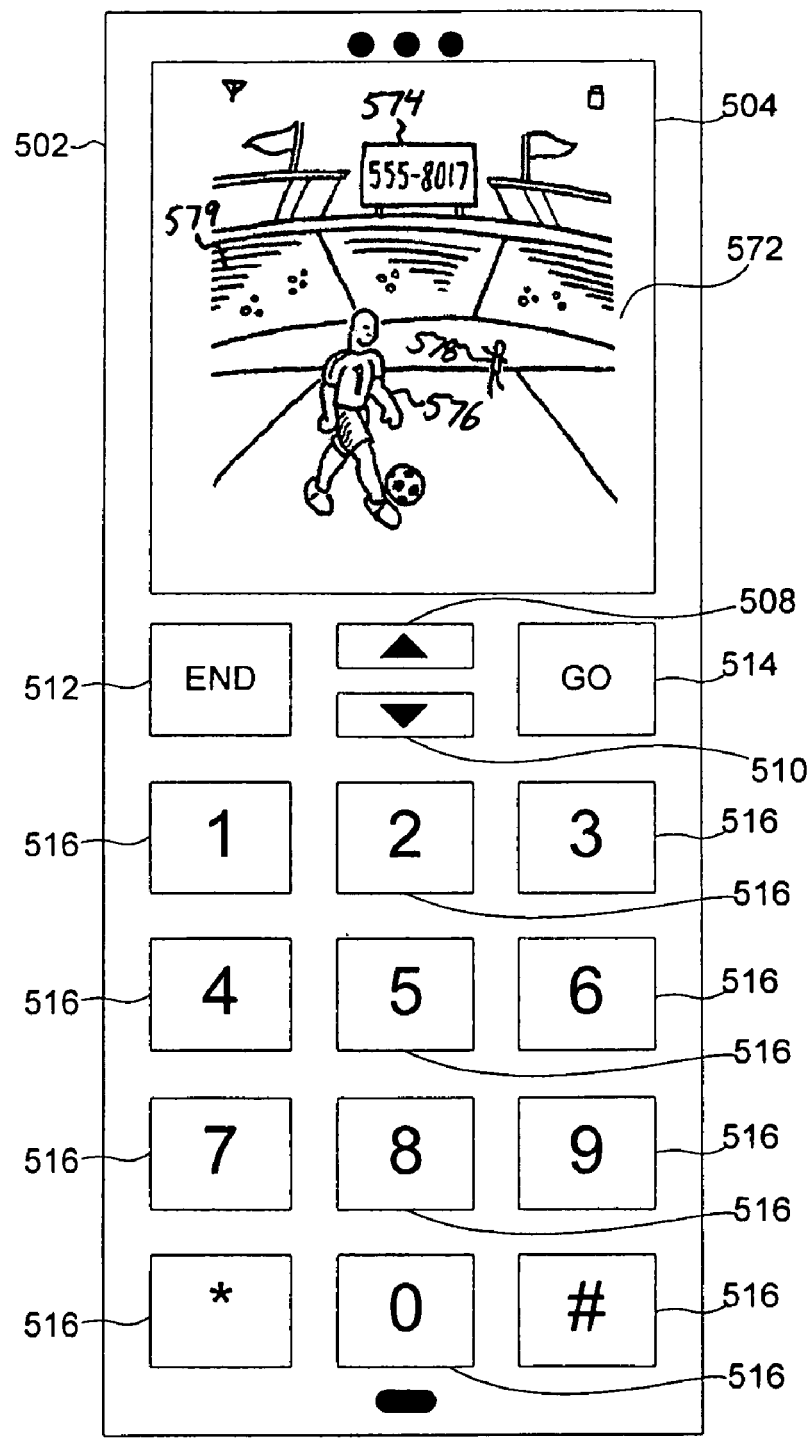
FIG. 5G illustrates a further alternative exemplary environment using system and usage data, in accordance with an example.

FIG. 5G illustrates a further alternative exemplary environment using system and usage data, in accordance with an example. As another example of a theme implemented for environment 504, sports theme 572 may be used. Here, elements 575-579 may be used to indicate calls, voicemails, text messages, e-mails, and the like. In some examples, when a call is received element 574 may display the caller's identification or telephone number. In some examples, portions of a message may be displayed. In still further examples, portions of an image may also be displayed or "previewed" on element 574, which may be configured to appear as a score board in a sporting venue or arena. In other examples, when a call is received, an avatar (e.g., element 576) may be displayed for a given caller. In other words, sports-oriented avatars (i.e., identified sports personalities) may be associated with callers identified or recognized by a user, which are stored in memory on device 502. Further, when an avatar (e.g., element 576) is presented for a caller, modifications may be made based on current and mean system and usage data. For example, if a call is received, element 578 for the preceding caller, voicemail, message, or the like may be moved into the background. As the preceding caller, voicemail, message, or the like continues to age (i.e., newer or more recent calls are received), the call is "moved" further into the background and into the "stands" of the sporting arena shown. In other examples, calls, voicemails, text messages, e-mails, and the like may be handled differently and are not limited to the techniques described above.

Figure 5H:
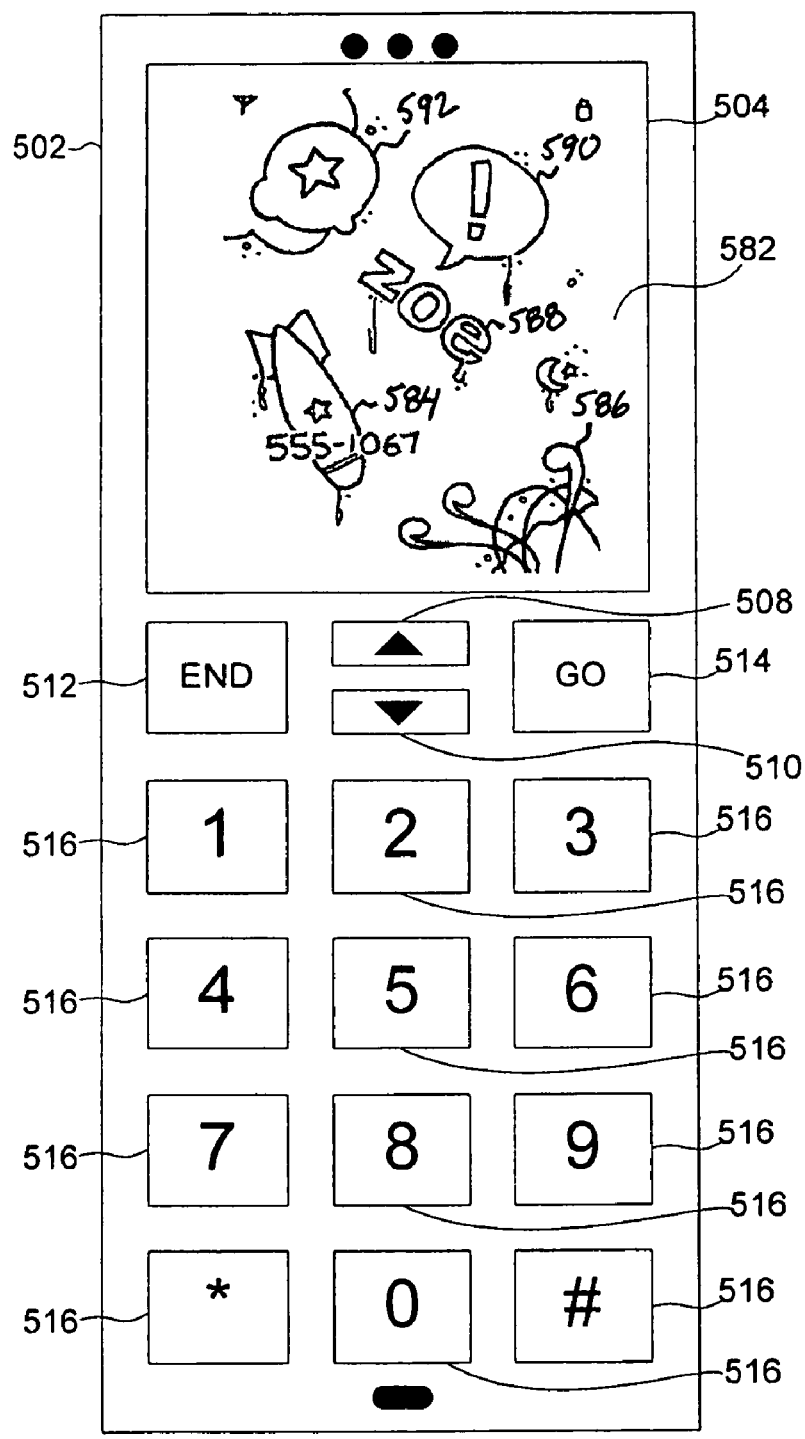
FIG. 5H illustrates a still further alternative exemplary environment using system and usage data, in accordance with an example.

FIG. 5H illustrates a still further alternative exemplary environment using system and usage data, in accordance with an example. In yet another example, graffiti theme 582 may be implemented with environment 504. Here, as calls, voicemails, text messages, e-mails, or the like are received, different graphical and textual images may be displayed. For example, callers may be identified using random types of images (e.g., rocket ship 584, space plant 586, name 588, and others). Status or emphasis may be placed using callouts 590 or 592. In some examples, different themes may also be implemented. In the example shown, a space-oriented theme is shown where messages or collections of messages may be represented as stellar or planetary bodies and shapes. In other examples, different themes may be used such as aquarium or underwater settings where elements such as marine life, undersea formations, submarines, and the like may be used to implement elements of environment 504. Other themes may be envisioned and the techniques described herein are for explanatory description and are not intended to be limiting or comprehensive.

Figure 6A:
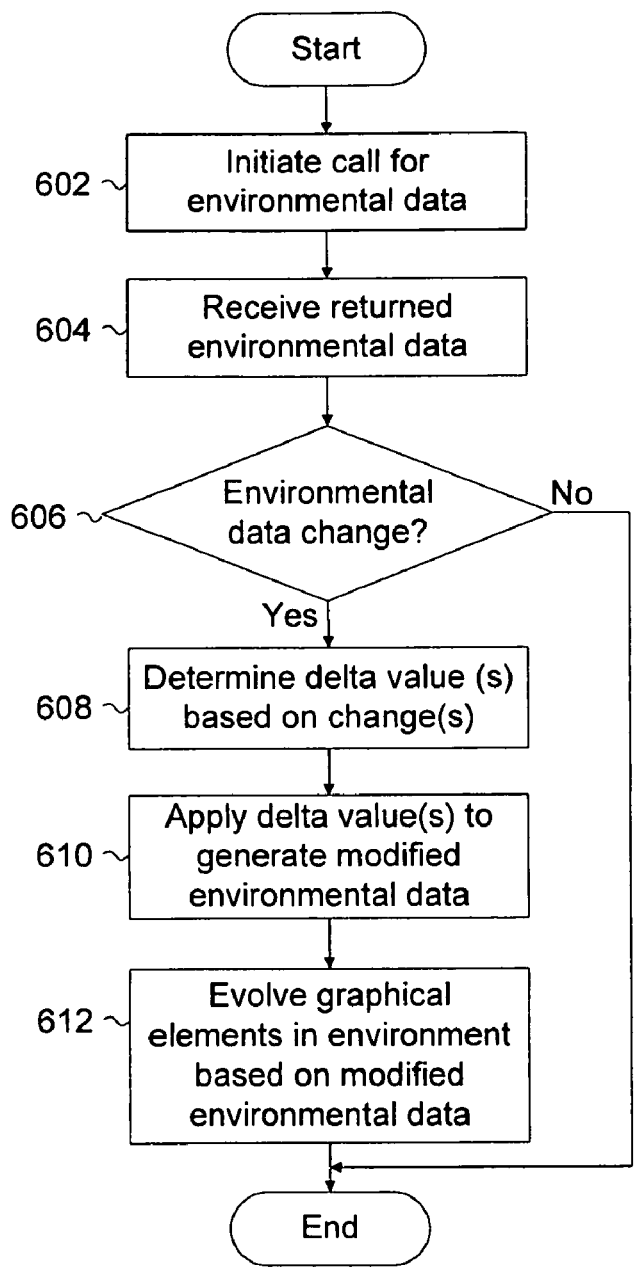
FIG. 6A illustrates an exemplary overall process for environment modification using system and usage data, in accordance with an example.

FIG. 6A illustrates an exemplary overall process for environment modification using system and usage data, in accordance with an example. Here, a call for environmental data is initiated (602). In some examples, a call may be a request sent by application 200 (FIG. 2A) to a device, application, operating system, or other data source. In other examples, calls may be performed differently to sources other than those described above. Environmental data (i.e., system and usage data) is returned in response to calling, including system and usage data from an individual user's device (604). In some examples, system and usage data may also be retrieved from remote sources (e.g., a server, database, or other source) located on a data network (e.g., wireless, cell, or other telecommunications network). The environmental data is evaluated to determine whether a change occurred (606). If a change occurred, then a delta value is determined for the change (608). Once determined, the delta value is applied to the environmental values, parameters, or other numbers associated with the system or usage data that are used to display elements (e.g., graphical, video, images, photos, audio, and the like) in an environment (608). The application of the delta value or values generates a set of modified environmental data (610). Once generated, the modified environmental data is applied to evolve elements in an environment (612). In some examples, changes may occur that are reflected in system data, usage data, or both system and usage data. If device characteristics (e.g., amount of pre-paid calling time purchased, network conditions, signal strength, battery/power level, connection availability, and the like) change, then system data may be used to indicate the changes. If user behavior, preferences, history, characteristics and the like are affected, changes may be reflected in usage data. In other examples, the above-described processes may be varied and are not limited to the examples shown and described.

Figure 6B:
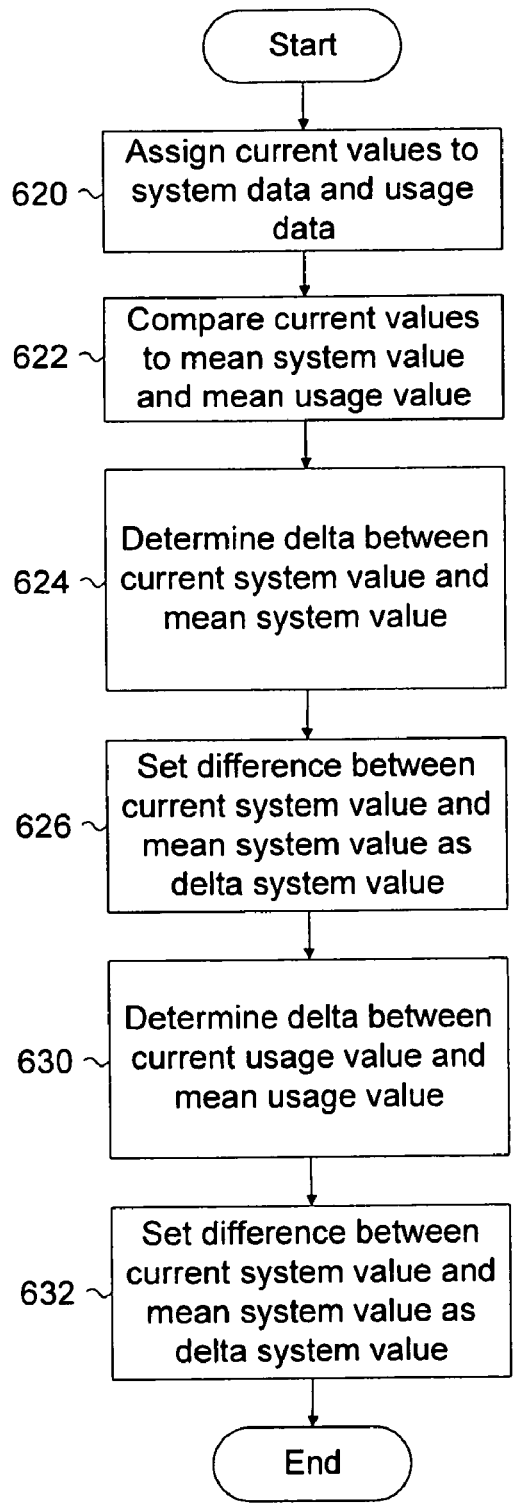
FIG. 6B illustrates an exemplary sub-process for determining delta value, in accordance with an example.

FIG. 6B illustrates an exemplary sub-process for determining delta value, in accordance with an example. Here, a sub-process for determining a delta value or set of delta values (e.g., 608 (FIG. 6A)) may be determined. Current values are assigned to system and usage data called from various data sources of an individual user's device (e.g., device 502 (FIGS. 5A-5H)) (620). Assigned current values are compared to mean system values and mean usage values (622). Based on the comparison, a delta (i.e., quantifiable value for a change) is determined based on the difference in value between current system values and mean system values (624). The determined delta is set as the delta system value (626). A delta is also determined based on the compared, quantifiable difference in value between current usage value and mean usage value (626). The difference is set as the mean usage value (628). In some examples, the above-described process may be used for various types of values or parameters included in either system or usage data.

For example, the above-described processes may be used to determine whether system or usage data changed when a call (e.g., telephone call, call from a wireless caller, and the like) is received and, if so, how an environment may be modified to reflect an evolutionary change to the environment. When a call is received, a change in system value may be determined using the above-described process if battery/power level is reduced, signal strength changes, the call was dropped or not answered, or other device conditions are changed. A change in usage data may be determined by incrementing an actual call count, updating a mean usage value for the number of calls received on a monthly basis by a user, increasing the amount of storage space used by a user if the call or message was not answered, but stored to voicemail or a message inbox, and others. In other examples, different system and usage data changes may occur and the above-described techniques may be used to determine delta values that are used to modify elements in an environment to present an evolved display. In other examples, the above-described processes may be varied and are not limited to the example shown and described.

Figure 7:
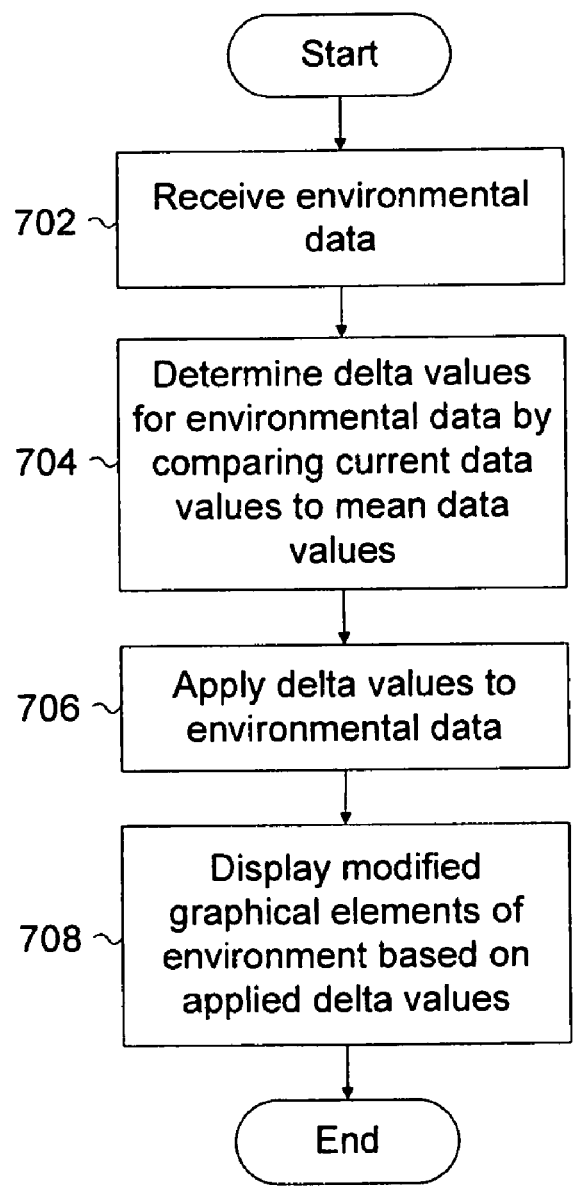
FIG. 7 illustrates an alternative exemplary overall process for environment modification using system and usage data, in accordance with an example.

FIG. 7 illustrates an alternative exemplary overall process for environment modification using system and usage data, in accordance with an example. Here, environmental data is received (702). In some examples, environmental data may include system and usage data for an individual user's device, stored locally and/or remotely. Delta values are determined for both system data and usage data by comparing current data values to mean environmental data values (704). The delta values are applied to the received environmental data (706). Graphical elements in an environment may be modified based on the applied delta values. In some examples, no changes may occur in system data and/or usage data, in which case deltas would not be applied to modify graphical elements in an environment. Using the above-described techniques and processes, environments and elements may be modified or evolved to reflect changes that are customized in nature for an individual user. For example, a single instance of a balloon element (e.g., elements 568-569 (FIG. 5F)) may represent a single message for a user while another single instance of a balloon element may represent twenty (20) messages for a different user because the delta values are determined based on the current and mean values of each user and his or her individual system, behavior, preferences, characteristics, and the like. Environment modification using the above-described techniques allows for enhanced context, personal relevancy, and dynamic UIs and displays that improve user experiences. The above-described techniques may be varied and are not limited to the examples shown.

Figure 8:
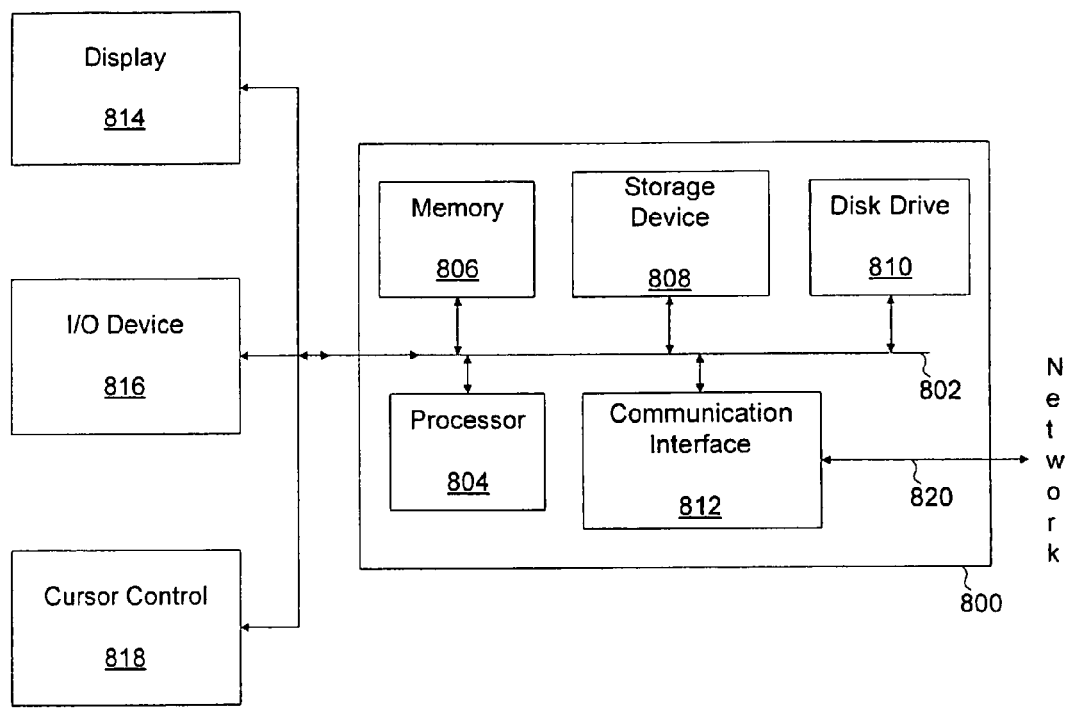
FIG. 8 illustrates an exemplary computer system suitable for environment modification using system and usage data, in accordance with an example.

FIG. 8 illustrates an exemplary computer system suitable for environment modification using system and usage data, in accordance with an example. In some examples, computer system 800 may be used to implement computer programs, applications, methods, processes, or other software to perform the above-described techniques. Computer system 800 includes a bus 802 or other communication mechanism for communicating information, which interconnects subsystems and devices, such as processor 804, system memory 806 (e.g., RAM), storage device 808 (e.g., ROM), disk drive 810 (e.g., magnetic or optical), communication interface 812 (e.g., modem or Ethernet card), display 814 (e.g., CRT or LCD), input device 816 (e.g., keyboard), and cursor control 818 (e.g., mouse or trackball).

According to some examples, computer system 800 performs specific operations by processor 804 executing one or more sequences of one or more instructions stored in system memory 806. Such instructions may be read into system memory 806 from another computer readable medium, such as static storage device 808 or disk drive 810. In some examples, hard-wired circuitry may be used in place of or in combination with software instructions for implementation.

The term "computer readable medium" refers to any medium that participates in providing instructions to processor 804 for execution. Such a medium may take many forms, including but not limited to, non-volatile media, volatile media, and transmission media. Non-volatile media includes, for example, optical or magnetic disks, such as disk drive 810. Volatile media includes dynamic memory, such as system memory 806. Transmission media includes coaxial cables, copper wire, and fiber optics, including wires that comprise bus 802. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 800. According to some examples, two or more computer systems 800 coupled by communication link 820 (e.g., LAN, PSTN, or wireless network) may perform the sequence of instructions in coordination with one another. Computer system 800 may transmit and receive messages, data, and instructions, including program, i.e., application code, through communication link 820 and communication interface 812. Received program code may be executed by processor 804 as it is received, and/or stored in disk drive 810, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:

displaying, by an electronic device, a user interface for the electronic device, wherein the user interface comprises a plurality of graphical images that corresponds to a same visual theme, wherein the visual theme is user-selectable from a plurality of visual themes;

wherein one of the plurality of graphical images corresponds to usage data and includes a visual characteristic that indicates a current status of the usage data, wherein the usage data indicates transmissions to or transmissions from the electronic device, or types of applications used or launched on the electronic device by a user of the electronic device;

wherein another one of the plurality of graphical images corresponds to electronic device system data and includes a visual characteristic that indicates a current status of the electronic device system data;

receiving updated usage data and determining that the updated usage data meets a user-specific threshold;

in response to determining that the updated usage data meets the user-specific threshold, modifying the visual characteristic of said one of the plurality of graphical images corresponding to usage data to indicate a new status for the usage data that reflects the updated usage data;

receiving updated electronic device system data and determining a status change in the electronic device system data;

and in response to determining the status change in the electronic device system data, modifying the visual characteristic of said other one of the plurality of graphical images corresponding to the electronic device system data to indicate a new status for the electronic device system data that reflects the updated electronic device system data;

wherein modifying the visual characteristic of said one of the plurality of graphical images and modifying the visual characteristic of said other one of the plurality of graphical images are displayed as changes in said same visual theme.

2. The method of claim 1, wherein the usage data is associated with user behavior.

3. The method of claim 2, wherein the user behavior indicates a first call quantity, the first call quantity comprising calls made by a user.

4. The method of claim 2, wherein the user behavior indicates a second call quantity, the second call quantity comprising calls received by a user.

5. The method of claim 1, wherein the usage data indicates a number of calls made by a user.

6. The method of claim 1, wherein the usage data indicates a number of messages received by a user.

7. The method of claim 1, wherein the electronic device system data indicates one or more characteristics associated with the electronic device.

8. The method of claim 7, wherein the one or more characteristics comprises a battery level indication.

9. The method of claim 7, wherein the one or more characteristics further comprises a network condition.

10. The method of claim 7, wherein the one or more characteristics further comprises a communication signal strength.

11. The method of claim 7, wherein the one or more characteristics further comprises a memory storage capacity level.

12. The method of claim 1, wherein the usage data indicates a number of messages sent by a user.

13. The method of claim 1, wherein said modifying the visual characteristic of said one of the plurality of the graphical images corresponding to usage data comprises expanding the size of said one of the plurality of the graphical images to indicate an increase in usage.

14. The method of claim 1, wherein at least one of the plurality of graphical images is an icon.

15. The method of claim 1, wherein at least one of the plurality of graphical images is an avatar.

16. The method of claim 1, wherein the visual theme is a landscape.

17. The method of claim 1, wherein the visual theme is a cityscape.

18. The method of claim 1, wherein the visual theme is an athletic arena.

19. The method of claim 1, wherein the visual theme is an aquatic scene.

20. A method, comprising:
- displaying, by an electronic device, a user interface for the electronic device, wherein the user interface comprises a plurality of graphical images that corresponds to a same visual theme, wherein the visual theme is user-selectable from a plurality of visual themes;
- wherein one of the plurality of graphical images corresponds to usage data and includes a visual characteristic that indicates a current status of the usage data, wherein the usage data indicates transmissions to or transmissions from the electronic device, or types of applications used or launched on the electronic device by a user of the electronic device;
- receiving updated usage data and determining that the updated usage data meets a user-specific threshold, wherein the updated usage data represents an increase in usage;
- and
- in response to determining that the updated usage data meets the user-specific threshold, modifying the visual characteristic of said one of the plurality of graphical images corresponding to usage data to indicate a new status for the usage data that reflects the updated usage data;
- wherein modifying the visual characteristic of said one of the plurality of graphical images is displayed as a change in said same visual theme.

21. The method of claim 20, wherein the increased usage data corresponds to an increase in a number of calls made by a user.

22. The method of claim 20, wherein the increased usage data corresponds to an increase in the number of messages received by a user.

23. The method of claim 20, wherein said modifying the visual characteristic of said one of the plurality of the graphical images corresponding to usage data comprises enlarging the visual size of said one of the plurality of the graphical images to indicate the increase in usage.

24. The method of claim 20, wherein enlarging the visual size of the graphical image is specified by a user preference.

25. The method of claim 20, further comprising:
- receiving updated electronic device system data and determining a status change in the electronic device system data;
- and
- in response to determining the status change in the electronic device system data, modifying the visual characteristic of said other one of the plurality of graphical images corresponding to the electronic device system data to indicate a new status for the electronic device system data that reflects the updated electronic device system data;
- wherein modifying the visual characteristic of said other one of the plurality of graphical images is displayed as a change in said same visual theme.

26. A system, comprising:
- a memory; and
- a processor coupled to the memory, wherein the memory comprises program instructions executable by the processor to:
- display, by an electronic device, a user interface for the electronic device, wherein the user interface comprises a plurality of graphical images that corresponds to a same visual theme, wherein the visual theme is user-selectable from a plurality of visual themes;
- wherein one of the plurality of graphical images corresponds to usage data and includes a visual characteristic that indicates a current status of the usage data, wherein the usage data indicates transmissions to or transmissions from the electronic device, or types of applications used or launched on the electronic device by a user of the electronic device;
- wherein another one of the plurality of graphical images corresponds to electronic device system data and includes a visual characteristic that indicates a current status of the electronic device system data;
- receive updated usage data and determine that the updated usage data meets a user-specific threshold;
- in response to determining that the updated usage data meets the user-specific threshold, modify the visual characteristic of said one of the plurality of graphical images corresponding to usage data to indicate a new status for the usage data that reflects the updated usage data;
- receive updated electronic device system data and determine a status change in the electronic device system data;
- and
- in response to determining the status change in the electronic device system data, modify the visual characteristic of said other one of the plurality of graphical images corresponding to the electronic device system data to indicate a new status for the electronic device system data that reflects the updated electronic device system data;
- wherein modifying the visual characteristic of said one of the plurality of graphical images and modifying the visual characteristic of said other one of the plurality of graphical images are displayed as changes in said same visual theme.

27. A system, comprising:
- a memory; and
- a processor coupled to the memory, wherein the memory comprises program instructions executable by the processor to:
- display an environment which comprises a user interface for an electronic device, wherein the user interface comprises a plurality of graphical images which correspond to a visual theme, wherein, dependent on user preferences, at least two of the plurality of graphical images each correspond to respective data, wherein a visual characteristic of each one of the at least two graphical images indicates a current status of the respective, wherein at least one of the plurality of graphical images corresponds to user activity data which indicates cumulative user interaction with the electronic device, and wherein at least one of the plurality of graphical images corresponds to data for the electronic device;

receive input which indicates a change in status for the user activity data, wherein the change in status indicates an increase in user activity; and in response to receiving the input, change the visual characteristic of the graphical image which corresponds to user activity data to indicate a new status for the user activity data, wherein said changing comprises enlarging the visual size of the graphical image to indicate the increase in user activity, wherein said changing is dependent on the user preferences.

28. A computer program product embodied in a computer readable medium and comprising computer instructions executable to:

- display, by an electronic device, a user interface for the electronic device, wherein the user interface comprises a plurality of graphical images that corresponds to a same visual theme, wherein the visual theme is user-selectable from a plurality of visual themes;
- wherein one of the plurality of graphical images corresponds to usage data and includes a visual characteristic that indicates a current status of the usage data, wherein the usage data indicates transmissions to or transmissions from the electronic device, or types of applications used or launched on the electronic device by a user of the electronic device;
- wherein another one of the plurality of graphical images corresponds to electronic device system data and includes a visual characteristic that indicates a current status of the electronic device system data;
- receive updated usage data and determine that the updated usage data meets a user-specific threshold;
- in response to determining that the updated usage data meets the user-specific threshold, modify the visual characteristic of said one of the plurality of graphical images corresponding to usage data to indicate a new status for the usage data that reflects the updated usage data;
- receive updated electronic device system data and determine a status change in the electronic device system data;
- and
- in response to determining the status change in the electronic device system data, modify the visual characteristic of said other one of the plurality of graphical images corresponding to the electronic device system data to indicate a new status for the electronic device system data that reflects the updated electronic device system data;
- wherein modifying the visual characteristic of said one of the plurality of graphical images and modifying the visual characteristic of said other one of the plurality of graphical images are displayed as changes in said same visual theme.

29. A computer program product embodied in a computer readable medium and comprising computer instructions executable to

- display, by an electronic device, a user interface for the electronic device, wherein the user interface comprises a plurality of graphical images that corresponds to a same visual theme, wherein the visual theme is user-selectable from a plurality of visual themes;
- wherein one of the plurality of graphical images corresponds to usage data and includes a visual characteristic that indicates a current status of the usage data, wherein the usage data indicates transmissions to or transmissions from the electronic device, or types of applications used or launched on the electronic device by a user of the electronic device;
- receive updated usage data and determine that the updated usage data meets a user-specific threshold, wherein the updated usage data represents an increase in usage;
- and
- in response to determining that the updated usage data meets the user-specific threshold, modify the visual characteristic of said one of the plurality of graphical images corresponding to usage data to indicate a new status for the usage data that reflects the updated usage data, wherein said modifying comprises enlarging the visual size of said one of the plurality of graphical images to indicate the increase in usage;
- wherein modifying the visual characteristic of said one of the plurality of graphical images is displayed as a change in said same visual theme.

* * * * *